United States Patent
Kirillov et al.

(10) Patent No.: US 10,067,916 B2
(45) Date of Patent: *Sep. 4, 2018

(54) METHODS AND SYSTEMS FOR PROVIDING AN ACTIONABLE OBJECT WITHIN A THIRD-PARTY CONTENT SLOT OF AN INFORMATION RESOURCE OF A CONTENT PUBLISHER

(71) Applicant: Google Inc., Mountain View, CA (US)

(72) Inventors: Roman Kirillov, London (GB); Andrew Tyler, London (GB); Daniel Banfield, London (GB); Hassan Mansoor, Kettering (GB); Daniel Matthew Goodridge, London (GB); Louis Aidan Collard, London (GB)

(73) Assignee: Google LLC, Mountain View, CA (US)

( * ) Notice: Subject to any disclaimer, the term of this patent is extended or adjusted under 35 U.S.C. 154(b) by 187 days.

This patent is subject to a terminal disclaimer.

(21) Appl. No.: 15/255,591

(22) Filed: Sep. 2, 2016

(65) Prior Publication Data

US 2016/0371230 A1 Dec. 22, 2016

Related U.S. Application Data

(63) Continuation of application No. 14/181,199, filed on Feb. 14, 2014, now Pat. No. 9,461,936.

(51) Int. Cl.
*G06F 15/16* (2006.01)
*G06F 17/21* (2006.01)
(Continued)

(52) U.S. Cl.
CPC ............ *G06F 17/212* (2013.01); *G06F 17/00* (2013.01); *G06F 17/2247* (2013.01);
(Continued)

(58) Field of Classification Search
CPC ........ G06F 17/212; G06F 17/00; G06F 17/24; G06F 17/30; G06F 17/30893;
(Continued)

(56) References Cited

U.S. PATENT DOCUMENTS 5,781,894 A  7/1998 Petrecca et al.
5,973,734 A  10/1999 Anderson
(Continued)

FOREIGN PATENT DOCUMENTS

CN  103093418 A  1/1900

OTHER PUBLICATIONS

"Watch Photo Slideshow on TV." Create TV Photo Slideshow DVD. SlideWow, n.d. Web. Jun. 29, 2012. <http://www.slidewow.com/watch-photo-slideshow-on-tv.html>.
(Continued)

*Primary Examiner* — Michael Y Won
(74) *Attorney, Agent, or Firm* — Foley & Lardner LLP

(57) ABSTRACT

Systems and methods for providing an actionable object within a third-party content slot of an information resource of a content publisher. A processor receives an indication of interest in providing, for display, a creative within at least one third-party content slot of an information resource of a content publisher. The information resource includes third-party content slots available to be reserved to serve creatives. The processor identifies, on the information resource, at least one third-party content slot available to be reserved to serve one or more creatives. The processor inserts an actionable object within the identified third-party content slot, the actionable object configured to generate a request to provide an interface for reserving the identified third-party content slot to display the creative responsive to an action being taken on the actionable object. The processor renders the information resource including the inserted actionable object within the identified third-party content slot.

20 Claims, 15 Drawing Sheets

(51) Int. Cl.
H04L 12/927 (2013.01)
G06F 17/00 (2006.01)
G06F 17/30 (2006.01)
G06Q 10/00 (2012.01)
G06F 17/22 (2006.01)
G06F 17/24 (2006.01)
G06Q 30/02 (2012.01)
G06T 3/40 (2006.01)
H04L 29/08 (2006.01)

(52) U.S. Cl.
CPC .............. *G06F 17/24* (2013.01); *G06F 17/30* (2013.01); *G06F 17/30893* (2013.01); *G06Q 10/00* (2013.01); *G06Q 30/0277* (2013.01); *G06T 3/403* (2013.01); *H04L 47/806* (2013.01); *H04L 67/02* (2013.01); *H04L 67/20* (2013.01); *G06T 2210/12* (2013.01); *G06T 2210/22* (2013.01)

(58) Field of Classification Search
CPC ... G06F 17/2247; H04L 47/806; H04L 67/02; H04L 67/20; G06Q 10/00; G06Q 30/0277; G06T 3/403; G06T 2210/12; G06T 2210/22
USPC ........................................ 709/203, 219, 226
See application file for complete search history.

(56) References Cited

U.S. PATENT DOCUMENTS

| | | | |
|---|---|---|---|
| 6,151,643 A | 11/2000 | Cheng et al. | |
| 6,167,382 A * | 12/2000 | Sparks ................... | G06F 17/211 705/14.73 |
| 6,654,506 B1 | 11/2003 | Luo et al. | |
| 7,516,135 B2 | 4/2009 | Bayyapu | |
| 7,685,278 B2 | 3/2010 | Cohen et al. | |
| 7,783,697 B2 | 8/2010 | Roberts et al. | |
| 8,180,178 B2 | 5/2012 | Cheatle | |
| 8,237,818 B2 | 8/2012 | Kato | |
| 8,255,949 B1 | 8/2012 | Bayer et al. | |
| 8,346,607 B1 | 1/2013 | Benson et al. | |
| 8,351,730 B2 | 1/2013 | Zhang et al. | |
| 8,352,856 B2 | 1/2013 | Fillion et al. | |
| 8,380,570 B2 | 2/2013 | Agarwal et al. | |
| 8,472,792 B2 | 6/2013 | Butt et al. | |
| 8,495,206 B2 | 7/2013 | Borghetti et al. | |
| 8,520,695 B1 | 8/2013 | Rubin et al. | |
| 8,538,077 B2 | 9/2013 | Zitnick, III | |
| 8,538,740 B2 | 9/2013 | Kumar et al. | |
| 8,661,464 B2 | 2/2014 | Arankalle et al. | |
| 8,712,850 B1 | 4/2014 | Raghunathan et al. | |
| 8,732,322 B1 | 5/2014 | Agrawal et al. | |
| 2003/0001846 A1* | 1/2003 | Davis ................... | G11B 27/031 345/474 |
| 2003/0149937 A1 | 8/2003 | McElfresh et al. | |
| 2004/0168123 A1 | 8/2004 | Lomelin-Stoupignan et al. | |
| 2005/0015488 A1 | 1/2005 | Bayyapu | |
| 2005/0256971 A1 | 11/2005 | Colrain et al. | |
| 2007/0100698 A1 | 5/2007 | Neiman et al. | |
| 2007/0220575 A1* | 9/2007 | Cooper ................ | H04N 7/1675 725/118 |
| 2008/0091526 A1 | 4/2008 | Shoemaker | |
| 2008/0095470 A1 | 4/2008 | Chao et al. | |
| 2008/0126192 A1 | 5/2008 | Patel et al. | |
| 2008/0243601 A1 | 10/2008 | Patel et al. | |
| 2009/0006191 A1 | 1/2009 | Arankalle et al. | |
| 2009/0024468 A1 | 1/2009 | Broder et al. | |
| 2009/0043648 A1 | 2/2009 | Mahdian et al. | |
| 2009/0135198 A1 | 5/2009 | Lee et al. | |
| 2009/0150769 A1 | 6/2009 | Konnola et al. | |
| 2009/0228360 A1* | 9/2009 | Mancarella ............ | G06Q 30/02 705/14.53 |
| 2010/0049603 A1 | 2/2010 | Peterson et al. | |
| 2010/0290617 A1 | 11/2010 | Nath | |
| 2011/0282727 A1 | 11/2011 | Phan et al. | |
| 2012/0254333 A1 | 10/2012 | Chandramouli et al. | |
| 2012/0297038 A1 | 11/2012 | Mei et al. | |
| 2013/0124342 A1 | 5/2013 | Virkar et al. | |
| 2013/0246180 A1 | 9/2013 | Steelberg et al. | |
| 2013/0346182 A1 | 12/2013 | Cheng et al. | |
| 2014/0136971 A1 | 5/2014 | Kumar et al. | |
| 2014/0279727 A1 | 9/2014 | Baraniuk et al. | |
| 2014/0304069 A1 | 10/2014 | Lacey et al. | |
| 2014/0359058 A1 | 12/2014 | Karnawat et al. | |
| 2015/0019335 A1 | 1/2015 | Zhou | |
| 2015/0073922 A1* | 3/2015 | Epperson ........... | G06Q 30/0277 705/14.73 |
| 2015/0154631 A1 | 6/2015 | Umeda | |
| 2015/0170200 A1 | 6/2015 | Rajkumar et al. | |
| 2015/0170336 A1 | 6/2015 | Lapointe | |
| 2015/0234548 A1* | 8/2015 | Pierre ................... | G06F 3/0482 715/768 |
| 2015/0235269 A1* | 8/2015 | Kirillov ............. | G06Q 30/0264 705/14.61 |
| 2015/0236979 A1 | 8/2015 | Kirillov et al. | |
| 2015/0237115 A1* | 8/2015 | Kirillov .................. | H04L 67/10 709/201 |
| 2015/0278876 A1 | 10/2015 | Xiong et al. | |
| 2016/0110082 A1* | 4/2016 | Zhang ................... | G06F 17/212 715/765 |
| 2016/0189235 A1* | 6/2016 | Biswas .............. | G06Q 30/0269 705/14.66 |
| 2016/0189244 A1* | 6/2016 | Chester .............. | G06Q 30/0276 705/14.72 |
| 2017/0185251 A1* | 6/2017 | Jain ........................ | G06F 3/0482 |

OTHER PUBLICATIONS

Ad Slot Media, 3 pages, Searched via internet on Jan. 31, 2014 at https://media.adslot.com/marketplace.
AdExchanger, Let's Call it What it is: Programmatic Direct, 7 pages, searched on Jan. 31, 2014 via online web at http://www.adexchanger.com/data-driven-thinking/programmatick-direct.
Cookson, Guy, Ad Placements Should Fit, Not Fight, the Publishers' Brand, 7 pages, Oct. 23, 2013.
Fisher, Bob. "Edges: Gradient Edge Detection." Bob Fisher's Personal Page. University of Edinburgh, Jul. 4, 1996. Web. Sep. 18, 2015. <http://homepages.inf.ed.ac.uk/rbf/CVonline/LOCAL_COPIES/MARBLE/low/edges/gradient. htm>.
International Search Report & Written Opinion on PCT/US2014/068856 dated Apr. 29, 2015.
Invitation to Pay Additional Fees on PCT/US2014/068856 dated Mar. 13, 2015.
Mobile Orchard, 2 pgs, Searched on Jan. 31, 2014 at http://mobileorchard.com/advertise/.
Notice of Allowance on U.S. Appl. No. 14/181,183 dated Dec. 14, 2015.
Notice of Allowance on U.S. Appl. No. 14/181,183 dated Sep. 15, 2015.
Notice of Allowance on U.S. Appl. No. 14/181,199 dated Mar. 1, 2016.
Notice of Allowance on U.S. Appl. No. 14/181,199 dated Jun. 15, 2016.
Offenberger, Brian, AdWords Display Ad Builder Creates Professional Quality Banner Ads for Free, Nov. 7, 2008, via internet http://www.brianoffenberger.com/blog/2008/11/07/adwords-display-ad-builder-creates-professional-quality-banner-ads-for-free/.
Office Action on U.S. Appl. No. 14/181,199 dated Sep. 30, 2015.
Office Action on U.S. Appl. No. 14/181,216 dated Oct. 7, 2015.
Office Action on U.S. Appl. No. 14/181,191 dated Apr. 11, 2016.
Office Action on U.S. Appl. No. 14/181,191 dated Jul. 14, 2016.
Office Action on U.S. Appl. No. 14/181,198 dated Mar. 24, 2016.
Office Action on U.S. Appl. No. 14/181,206 dated Mar. 2, 2016.
Roos, Mikael, CImage and img.php for image resize, crop and prosceeing using PHP GD, 29 pages Jan. 27, 2014 via internet http://dbwebb.se/opensource/cimage-and-img-php-for-image-resize-crop-and-processing-using-php-gd.

(56) References Cited

OTHER PUBLICATIONS

Selling Ads with BuySellAds, 4 pages, Searched on Jan. 31, 2014 via online at http://buysellads.com/publishers.
U.S. Appl. No. 14/181,206, filed Feb. 14, 2014.
U.S. Appl. No. 14/181,198, filed Feb. 14, 2014.
U.S. Appl. No. 14/181,183, filed Feb. 14, 2014.
U.S. Appl. No. 14/181,191, filed Feb. 14, 2014.
U.S. Appl. No. 14/181,216, filed Feb. 14, 2014.
U.S. Appl. No. 14/181,199, filed Feb. 14, 2014.

* cited by examiner

600

605
RECEIVE A REQUEST TO RECEIVE INFORMATION FOR INSERTING A CREATIVE WITHIN ONE OR MORE THIRD-PARTY CONTENT SLOTS AVAILABLE ON THE INFORMATION RESOURCE RESPONSIVE TO AN ACTION TO AN OBJECT INCLUDED WITHIN AN INFORMATION RESOURCE OF A PUBLISHER

610
PROVIDE, FOR DISPLAY, AN INTERFACE THAT INCLUDES THE INFORMATION REGARDING INSERTING THE CREATIVE WITHIN ONE OR MORE THIRD-PARTY CONTENT SLOTS ON THE PUBLISHER'S RESOURCE

616
RECEIVE, VIA THE INTERFACE, A REQUEST TO INSERT A CREATIVE WITHIN A PARTICULAR THIRD-PARTY CONTENT SLOT OF THE PLURALITY OF THIRD-PARTY CONTENT SLOTS ACCORDING TO A RESERVATION POLICY

620
STORE DATA ASSOCIATED WITH THE REQUEST TO INSERT THE CREATIVE WITHIN THE PARTICULAR THIRD-PARTY CONTENT SLOT

RECEIVE A REQUEST TO RECEIVE AN INDICATION OF INTEREST IN PROVIDING, FOR DISPLAY, A CREATIVE WITHIN AT LEAST ONE THIRD-PARTY CONTENT SLOT OF AN INFORMATION RESOURCE OF A PUBLISHER

910

IDENTIFY AT LEAST ONE THIRD-PARTY CONTENT SLOT INCLUDED IN THE INFORMATION RESOURCE AVAILABLE TO BE RESERVED TO SERVE ONE OR MORE CREATIVES

915

INSERT AN ACTIONABLE RESERVATION OBJECT WITHIN THE IDENTIFIED THIRD-PARTY CONTENT SLOT THAT IS CONFIGURED TO GENERATE A REQUEST TO PROVIDE AN INTERFACE FOR RESERVING THE IDENTIFIED THIRD-PARTY CONTENT SLOT

920

RENDER THE INFORMATION RESOURCE INCLUDING THE INSERTED ACTIONABLE OBJECT WITHIN THE IDENTIFIED THIRD-PARTY CONTENT SLOT

FIG. 9

METHODS AND SYSTEMS FOR PROVIDING AN ACTIONABLE OBJECT WITHIN A THIRD-PARTY CONTENT SLOT OF AN INFORMATION RESOURCE OF A CONTENT PUBLISHER

CROSS-REFERENCE TO RELATED PATENT APPLICATIONS

This application is a continuation application claiming priority to U.S. patent application Ser. No. 14/181,199, titled "Methods and Systems for Providing an Actionable Object Within a Third-Party Content Slot of an Information Resource of a Content Publisher," filed on Feb. 14, 2014, the entirety of which is herein incorporated by reference.

BACKGROUND

In a computer networked environment such as the internet, entities such as people or companies provide information for public display on web pages or other online documents. The documents can include information provided by the entities via a computing device for display on the internet. Content can also be provided by third parties for display on the documents together with the information provided by the entities. Thus, a person viewing a document can access the information that is the subject of the document, as well as third party content that may or may not be related to the subject matter of the document.

SUMMARY

At least one aspect is directed to a computer implemented method of predicting a conversion rate of a content publisher-third-party content provider pair. A processor identifies, from log data, a plurality of content publisher-provider pairs. Each content publisher-provider pair corresponds to a third-party content provider associated with at least one creative receiving at least one conversion when served on one or more information resources of the content publisher. The processor determines, for each content publisher-provider pair, from the log data, a conversion rate that corresponds to a ratio of a number of conversions associated with the at least one creative to a number of impressions received by the at least one creative when served on the one or more information resources of the content publisher. The processor determines, for each content publisher-provider pair, feature data of the content publisher and feature data of the third-party content provider. The processor then transforms the determined feature data of the content publishers and third-party content providers and the conversion rates of the plurality of content publisher-provider pairs into a model useful for predicting a conversion rate of a given content publisher-provider pair different from the identified plurality of content publisher-provider pairs. In some implementations, the conversion rate prediction model is a regression model.

In some implementations, the processor identifies a candidate content publisher-provider pair different from the identified plurality of content publisher-provider pairs. The processor then predicts a conversion rate of the candidate content publisher-provider pair using the model for predicting a conversion rate of a given content publisher-provider pair.

In some implementations, the conversion rate for a content publisher-provider pair is a click through rate. The processor can determine the click through rate by calculating a ratio of a number of clicks on at least one creative of the third-party content provider provided for display on a resource of the content publisher to a total number of impressions received by the at least one creative of the third-party content provider provided for display on the resource of the content publisher.

In some implementations, the processor can determine, for each content publisher-provider pair, feature data of the content publisher and feature data of the third-party content provider by determining feature data of the content publisher and the third-party content provider based on one or more of topics of content included in information resources of the content publisher and information resources of the third-party content provider, language and geo-locality.

In some implementations, the processor receives, from a third-party content provider, a request for a list of content publishers having at least one information resource on which to serve creatives. The processor then determines feature data of the third-party content provider. The processor identifies a plurality of candidate content publishers on which creatives of the third-party content provider can be served. The processor then determines feature data of the identified plurality of content publishers. The processor then determines, using the model, for each of the plurality of candidate content publishers and the third-party content provider associated with the request, a predicted conversion rate of the content publisher-provider pair based on the feature data of the candidate content publisher and feature data of the third-party content provider. In some implementations, the processor can provide, to the third-party content provider, the list of content publishers having at least one resource on which to serve creatives, the list including the plurality of candidate content publishers and the determined predicted conversion rate of the content publisher-provider pair.

In some implementations, the processor can receive, from a content publisher, a request for a list of third-party content providers having at least one creative to serve on a resource of the content publisher. The processor can determine feature data of the content publisher. The processor can then identify a plurality of candidate third-party content providers having at least one creative to serve on a resource of the content publisher. The processor can determine feature data of the identified plurality of candidate third-party content providers. The processor can then determine, using the model, for each of the plurality of candidate third-party content providers and the content publisher associated with the request, a predicted conversion rate of the content publisher-provider pair based on the feature data of the candidate content publisher and feature data of the third-party content provider. In some implementations, the processor can provide, to the content publisher, the list of third-party content providers having at least one creative to serve on a resource of the content publisher, the list including the plurality of candidate third-party content providers and the determined predicted conversion rate of the content publisher-provider pair.

In some implementations, to determine, from the log data, a conversion rate for each content publisher-provider pair, the processor can determine, from the log data, a total number of impressions received by creatives of the third-party content provider and determine a total number of conversions received by the creative of the third-party content provider. The processor can further determine a ratio of the total number of conversions to the total number of impressions.

At least one aspect is directed to a system of predicting a conversion rate of a content publisher-third-party content provider pair. The system includes a data processing system configured to identify, from log data, a plurality of content publisher-provider pairs. Each content publisher-provider pair corresponds to a third-party content provider associated with at least one creative receiving at least one conversion when served on one or more information resources of the content publisher. The data processing system is configured to determine, for each content publisher-provider pair, from the log data, a conversion rate that corresponds to a ratio of a number of conversions associated with the at least one creative to a number of impressions received by the at least one creative when served on the one or more information resources of the content publisher. The data processing system is configured to determine, for each content publisher-provider pair, feature data of the content publisher and feature data of the third-party content provider. The data processing system is configured to then transform the determined feature data of the content publishers and third-party content providers and the conversion rates of the plurality of content publisher-provider pairs into a model useful for predicting a conversion rate of a given content publisher-provider pair different from the identified plurality of content publisher-provider pairs. In some implementations, the conversion rate prediction model is a regression model.

In some implementations, the data processing system is further configured to identify a candidate content publisher-provider pair different from the identified plurality of content publisher-provider pairs. The data processing system is configured to then predict a conversion rate of the candidate content publisher-provider pair using the model for predicting a conversion rate of a given content publisher-provider pair.

In some implementations, the conversion rate for a content publisher-provider pair is a click through rate. The data processing system can determine the click through rate by calculating a ratio of a number of clicks on at least one creative of the third-party content provider provided for display on a resource of the content publisher to a total number of impressions received by the at least one creative of the third-party content provider provided for display on the resource of the content publisher.

In some implementations, the data processing system can determine, for each content publisher-provider pair, feature data of the content publisher and feature data of the third-party content provider by determining feature data of the content publisher and the third-party content provider based on one or more of topics of content included in information resources of the content publisher and information resources of the third-party content provider, language and geo-locality.

At least one aspect is directed to a computer-readable storage medium device storing instructions that when executed by one or more data processors, cause the one or more data processors to perform operations for predicting a conversion rate of a content publisher-third-party content provider pair. The operations include identifying, from log data, a plurality of content publisher-provider pairs. Each content publisher-provider pair corresponds to a third-party content provider associated with at least one creative receiving at least one conversion when served on one or more information resources of the content publisher. The operations include determining, for each content publisher-provider pair, from the log data, a conversion rate that corresponds to a ratio of a number of conversions associated with the at least one creative to a number of impressions received by the at least one creative when served on the one or more information resources of the content publisher. The operations include determining, for each content publisher-provider pair, feature data of the content publisher and feature data of the third-party content provider. The operations include transforming the determined feature data of the content publishers and third-party content providers and the conversion rates of the plurality of content publisher-provider pairs into a model useful for predicting a conversion rate of a given content publisher-provider pair different from the identified plurality of content publisher-provider pairs. In some implementations, the conversion rate prediction model is a regression model.

In some implementations, the operations further include identifying a candidate content publisher-provider pair different from the identified plurality of content publisher-provider pairs. The operations include predicting a conversion rate of the candidate content publisher-provider pair using the model for predicting a conversion rate of a given content publisher-provider pair.

In some implementations, the conversion rate for a content publisher-provider pair is a click through rate. The operations can include determining the click through rate by calculating a ratio of a number of clicks on at least one creative of the third-party content provider provided for display on a resource of the content publisher to a total number of impressions received by the at least one creative of the third-party content provider provided for display on the resource of the content publisher.

At least one aspect is directed to a computer implemented method of reserving a particular third-party content slot of an information resource of a content publisher. A processor of a data processing system receives, responsive to an action to an object included within an information resource of a content publisher, a request to receive information for inserting a creative within one or more third-party content slots available on the information resource. The request identifies the information resource of the content publisher. The processor provides, for display, an interface that includes the information regarding inserting the creative within one or more third-party content slots on the information resource of the content publisher. The information identifies a plurality of third-party content slots and costs associated with inserting the creative within each of the plurality of third-party content slots. The processor receives, via the interface, a request to insert a creative within a particular third-party content slot of the plurality of third-party content slots according to a reservation policy. The request identifies the creative to insert in the particular third-party content slot and the reservation policy identifies one or more rules according to which the creative is to be provided for display within the third-party content slot of the information resource. The processor stores data associated with the request to insert the creative within the particular third-party content slot. The stored data is useful to provide, for display, the creative within the particular third-party content slot of the information resource according to the reservation policy.

In some implementations, the interface includes information pertaining to third-party content slots included within the information resource of the content publisher and information pertaining to third-party content slots included within any information resource associated with the information resource of the content publisher. In some implementations, the interface includes a preview of the information resource of the content publisher. The preview identifies the third-party content slots in which creatives are insertable.

In some implementations, the processor receives, from log data, statistics pertaining to the information resource. The statistics include one or more of an average number of daily impressions, one of a size of the third-party content slot and a size of a creative insertable within the third-party content slot, and one or more topics with which the information resource is associated.

In some implementations, the processor determines a cost associated with inserting the creative within the third-party content slot according to the reservation policy. The processor provides, for display, the determined cost associated with inserting the creative within the third-party content slot according to the reservation policy. In some implementations, the reservation policy includes an indication of a time period over which to display the creative.

In some implementations, the processor receives, from a content publisher, a request to manage third-party content slot reservation and provides, to the content publisher, an object for insertion into a source code of the information resource of the content publisher. In some implementations, the object is provided as one of a link and a content item within a content slot.

At least one aspect is directed to a system of reserving a particular third-party content slot of an information resource of a content publisher. The system includes a data processing system configured to receive, responsive to an action to an object included within an information resource of a content publisher, a request to receive information for inserting a creative within one or more third-party content slots available on the information resource. The request identifies the information resource of the content publisher. The data processing system is also configured to provide, for display, an interface that includes the information regarding inserting the creative within one or more third-party content slots on the information resource of the content publisher. The information identifies a plurality of third-party content slots and costs associated with inserting the creative within each of the plurality of third-party content slots. The data processing system is also configured to receive, via the interface, a request to insert a creative within a particular third-party content slot of the plurality of third-party content slots according to a reservation policy. The request identifies the creative to insert in the particular third-party content slot and the reservation policy identifies one or more rules according to which the creative is to be provided for display within the third-party content slot of the information resource. The data processing system is also configured to store data associated with the request to insert the creative within the particular third-party content slot. The stored data is useful to provide, for display, the creative within the particular third-party content slot of the information resource according to the reservation policy.

In some implementations, the interface includes information pertaining to third-party content slots included within the information resource of the content publisher and information pertaining to third-party content slots included within any information resource associated with the information resource of the content publisher. In some implementations, the interface includes a preview of the information resource of the content publisher. The preview identifies the third-party content slots in which creatives are insertable.

In some implementations, the processor receives, from log data, statistics pertaining to the information resource. The statistics include one or more of an average number of daily impressions, one of a size of the third-party content slot and a size of a creative insertable within the third-party content slot, and one or more topics with which the information resource is associated.

In some implementations, the data processing system is also configured to determine a cost associated with inserting the creative within the third-party content slot according to the reservation policy. The data processing system is also configured to provide, for display, the determined cost associated with inserting the creative within the third-party content slot according to the reservation policy. In some implementations, the reservation policy includes an indication of a time period over which to display the creative.

In some implementations, the data processing system is also configured to receive, from a content publisher, a request to manage third-party content slot reservation and provides, to the content publisher, an object for insertion into a source code of the information resource of the content publisher. In some implementations, the object is provided as one of a link and a content item within a content slot.

At least one aspect is directed to a computer-readable storage medium device storing instructions that when executed by one or more data processors, cause the one or more data processors to perform operations for reserving a particular third-party content slot of an information resource of a content publisher. The operations include responsive to an action to an object included within an information resource of a content publisher, receiving, a request to receive information for inserting a creative within one or more third-party content slots available on the information resource, the request identifying the information resource of the content publisher. The operations also include providing, for display, an interface that includes the information regarding inserting the creative within one or more third-party content slots on the information resource of the content publisher, the information identifying a plurality of third-party content slots and costs associated with inserting the creative within each of the plurality of third-party content slots. The operations also include receiving, via the interface, a request to insert a creative within a particular third-party content slot of the plurality of third-party content slots according to a reservation policy, the request identifying the creative to insert in the particular third-party content slot and a reservation policy identifying one or more rules according to which the creative is to be provided for display within the third-party content slot of the information resource. The operations also include storing data associated with the request to insert the creative within the particular third-party content slot, the stored data useful to provide, for display, the creative within the particular third-party content slot of the information resource according to the reservation policy.

In some implementations, the interface includes information pertaining to third-party content slots included within the information resource of the content publisher and information pertaining to third-party content slots included within any information resource associated with the information resource of the content publisher. In some implementations, the interface includes a preview of the information resource of the content publisher. The preview identifies the third-party content slots in which creatives are insertable.

In some implementations, the operations further include receiving, from log data, statistics pertaining to the information resource, the statistics including one or more of an average number of daily impressions, one of a size of the third-party content slot and a size of a creative insertable within the third-party content slot, and one or more topics with which the information resource is associated.

At least one aspect is directed to a computer implemented method of providing an actionable object within a third-party content slot of an information resource of a content publisher. A processor of a data processing system receives an indication of interest in providing, for display, a creative within at least one third-party content slot of an information resource of a content publisher. The information resource includes one or more third-party content slots available to be reserved to serve one or more creatives. The processor identifies, on the information resource, at least one third-party content slot available to be reserved to serve one or more creatives. The processor inserts an actionable object within the identified third-party content slot, the actionable object configured to generate a request to provide an interface for reserving the identified third-party content slot to display the creative responsive to an action being taken on the actionable object. The processor renders the information resource including the inserted actionable object within the identified third-party content slot.

In some implementations, the processor receives an indication of an action taken on the actionable object and provides the interface for reserving the identified third-party content slot content slot.

In some implementations, providing the interface for reserving the identified third-party content slot includes rendering information for reserving one or more of the third-party item slots of the information resource. In some implementations, providing the interface for reserving the identified third-party content slot includes rendering a preview of the information resource. The preview of the information resource includes at least one label identifying the identified third-party content slot.

In some implementations, an indication of interest in providing, for display, a creative within at least one third-party content slot of an information resource includes receiving the request responsive to an action being taken on a view-changing actionable object. The view-changing actionable object is configured to cause the processor to render the information resource including the inserted actionable object within the identified third-party content slot.

In some implementations, identifying, on the information resource, at least one at least one third-party content slot includes identifying one or more third-party content slots having a tag. The tag indicates that the third-party content slot is configured to allow a creative to be inserted via a specific content placement management application.

In some implementations, the information resource includes a first third-party content slot configured to be reserved to display the creative and a second third-party content slot configured to display creatives selected for insertion via an content placement auction.

In some implementations, the actionable object is sized to fit within the identified third-party content slot and includes a visual representation of one of a link, a button and a banner.

In some implementations, receiving the request includes receiving the request responsive to an information resource of a content publisher including one or more third-party content slots rendered on a computing device.

At least one aspect is directed to a system of providing an actionable object within a third-party content slot of an information resource of a content publisher. The system includes a data processing system configured to receive an indication of interest in providing, for display, a creative within at least one third-party content slot of an information resource of a content publisher. The information resource includes one or more third-party content slots available to be reserved to serve one or more creatives. The data processing system is configured to identify, on the information resource, at least one third-party content slot available to be reserved to serve one or more creatives. The data processing system is configured to insert an actionable object within the identified third-party content slot. The actionable object is configured to generate a request to provide an interface for reserving the identified third-party content slot to display the creative responsive to an action being taken on the actionable object. The data processing system is configured to render the information resource including the inserted actionable object within the identified third-party content slot.

In some implementations, the data processing system is configured to receive an indication of an action taken on the actionable object and provides the interface for reserving the identified third-party content slot content slot.

In some implementations, providing the interface for reserving the identified third-party content slot includes rendering information for reserving one or more of the third-party item slots of the information resource. In some implementations, providing the interface for reserving the identified third-party content slot includes rendering a preview of the information resource. The preview of the information resource includes at least one label identifying the identified third-party content slot.

In some implementations, an indication of interest in providing, for display, a creative within at least one third-party content slot of an information resource includes receiving the request responsive to an action being taken on a view-changing actionable object. The view-changing actionable object is configured to cause the processor to render the information resource including the inserted actionable object within the identified third-party content slot.

In some implementations, identifying, on the information resource, at least one at least one third-party content slot includes identifying one or more third-party content slots having a tag. The tag indicates that the third-party content slot is configured to allow a creative to be inserted via a specific content placement management application.

In some implementations, the information resource includes a first third-party content slot configured to be reserved to display the creative and a second third-party content slot configured to display creatives selected for insertion via an content placement auction.

In some implementations, the actionable object is sized to fit within the identified third-party content slot and includes a visual representation of one of a link, a button and a banner.

In some implementations, receiving the request includes receiving the request responsive to an information resource of a content publisher including one or more third-party content slots rendered on a computing device.

At least one aspect is directed to a computer-readable storage medium device storing instructions that when executed by one or more data processors, cause the one or more data processors to perform operations for providing an actionable object within a third-party content slot of an information resource of a content publisher. The operations include receiving an indication of interest in providing, for display, a creative within at least one third-party content slot of an information resource of a content publisher, the information resource including one or more third-party content slots available to be reserved to serve one or more creatives, The operations include identifying, on the information resource, at least one third-party content slot included in the information resource available to be reserved to serve one or more creatives. The operations include inserting an actionable object within the identified third-party content slot, the actionable object configured to generate a request to provide an interface for reserving the identified third-party content slot to display the creative responsive to an action being taken on the actionable object. The operations include rendering the information resource including the inserted actionable object within the identified third-party content slot. In some implementations, the operations include receiving an indication of an action taken on the actionable object and providing the interface for reserving the identified third-party content slot content slot.

At least one aspect is directed to a computer implemented method of automatically resizing a creative based on dimensions of a content slot. A processor of a data processing system receives a creative including one or more visual content items, the creative having a first set of dimensions. The processor determines a content slot in which to insert the creative. The content slot has a second set of dimensions. The processor determines an aspect ratio of the creative and an aspect ratio of the content slot. The processor applies edge detection to identify edges of the visual content items included in the creative. The processor applies a bounding box around a substantial portion of the identified edges of the content items. The bounding box is sized to have an aspect ratio that corresponds to a smaller of the aspect ratio of the creative and the aspect ratio of the content slot. The processor then resizes the bounding box to fit within the second set of dimensions corresponding to the content slot.

In some implementations, applying edge detection includes applying laplacian edge detection. In some implementations, applying edge detection includes applying gradient edge detection. In some implementations, applying edge detection includes applying differential edge detection to detect sub-pixels.

In some implementations, the processor inserts a margin between the boundary and the identified edges. In some implementations, the processor determines, using heuristics, a predetermined size for the margin to be inserted between the boundary and the identified edges. In some implementations, the processor determining a size for the margin to be inserted between the boundary and the identified edges based on an aspect ratio of the boundary and an aspect ratio of the second set of dimensions corresponding to the content slot.

In some implementations, applying a bounding box around a substantial portion of the identified edges of the content items includes applying a smallest bounding box that encompasses at least 95% of pixels associated with content items included in the creative. In some implementations, the processor determines that the bounding box cannot be sized to include substantially all portions of all of the visual content items and generates a notification indicating that the creative cannot be automatically resized to fit within the dimensions of the content slot.

At least one aspect is directed to a system of automatically resizing a creative based on dimensions of a content slot. The system includes a data processing system configured to receive a creative including one or more visual content items, the creative having a first set of dimensions. The data processing system is configured to determine a content slot in which to insert the creative, the content slot having a second set of dimensions. The data processing system configured to determine an aspect ratio of the creative and an aspect ratio of the content slot. The data processing system configured to apply edge detection to identify edges of the visual content items included in the creative. The data processing system configured to apply a bounding box around a substantial portion of the identified edges of the content items. The bounding box is sized to have an aspect ratio that corresponds to a smaller of the aspect ratio of the creative and the aspect ratio of the content slot. The data processing system configured to resize the bounding box to fit within the second set of dimensions corresponding to the content slot.

In some implementations, applying edge detection includes applying laplacian edge detection. In some implementations, applying edge detection includes applying gradient edge detection. In some implementations, applying edge detection includes applying differential edge detection to detect sub-pixels.

In some implementations, the processor inserts a margin between the boundary and the identified edges. In some implementations, the processor determines, using heuristics, a predetermined size for the margin to be inserted between the boundary and the identified edges. In some implementations, the processor determining a size for the margin to be inserted between the boundary and the identified edges based on an aspect ratio of the boundary and an aspect ratio of the second set of dimensions corresponding to the content slot.

In some implementations, applying a bounding box around a substantial portion of the identified edges of the content items includes applying a smallest bounding box that encompasses at least 95% of pixels associated with content items included in the creative. In some implementations, the processor determines that the bounding box cannot be sized to include substantially all portions of all of the visual content items and generates a notification indicating that the creative cannot be automatically resized to fit within the dimensions of the content slot.

At least one aspect is directed to a computer-readable storage medium device storing instructions that when executed by one or more data processors, cause the one or more data processors to perform operations for automatically resizing a creative based on dimensions of a content slot. The operations include receiving a creative including one or more visual content items, the creative having a first set of dimensions. The operations include determining a content slot in which to insert the creative, the content slot having a second set of dimensions. In some implementations, the processor determines an aspect ratio of the creative and an aspect ratio of the content slot. The operations include applying edge detection to identify edges of the visual content items included in the creative. The operations include applying a bounding box around a substantial portion of the identified edges of the content items. The bounding box is sized to have an aspect ratio that corresponds to a smaller of the aspect ratio of the creative and the aspect ratio of the content slot. The operations include resizing the bounding box to fit within the second set of dimensions corresponding to the content slot. In some implementations, the operations include inserting a margin between the boundary and the identified edges and determining, using heuristics, a predetermined size for the margin to be inserted between the boundary and the identified edges.

These and other aspects and implementations are discussed in detail below. The foregoing information and the following detailed description include illustrative implementations of various aspects, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 6 is a flow diagram depicting an method of reserving a particular third-party content slot of an information resource of a content publisher, according to an illustrative implementation;

FIG. 9 is a flow diagram depicting an method of providing an actionable object within a third-party content slot of an information resource of a content publisher, according to an illustrative implementation;

DETAILED DESCRIPTION

Figure 1:
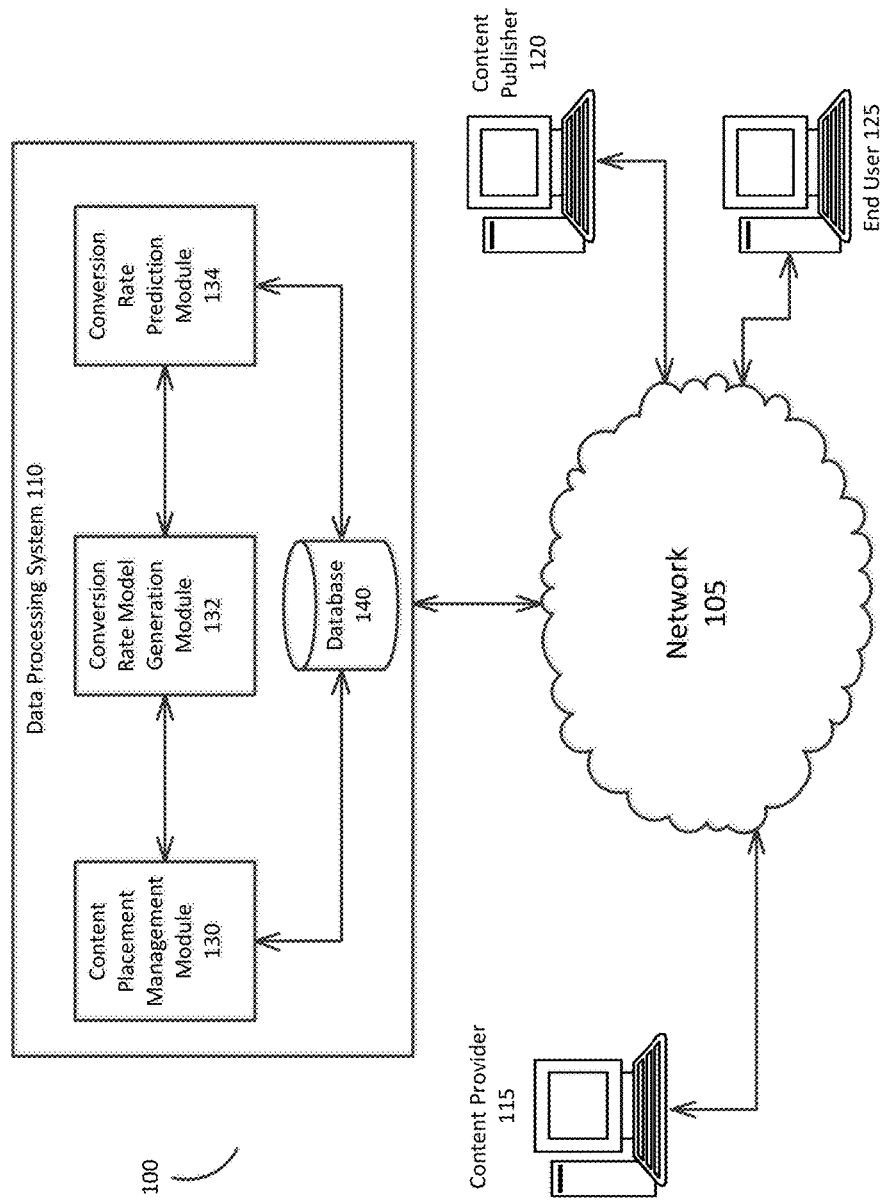
FIG. 1 is a block diagram depicting one environment to predict a conversion rate of a content publisher-third-party content provider pair, according to an illustrative implementation.

Following below are more detailed descriptions of various concepts related to, and implementations of, methods, apparatuses, and systems relating to direct placement of creatives of third-party content providers on information resources of content publishers. In a direct content placement campaign that allows for direct placement of creatives, a content provider can reserve a content slot of an information resource of a content publisher such that each time the information resource is served, a creative of the content provider is provided for display within the content slot of the information resource. In particular, the present disclosure relates to methods, apparatuses and systems relating to predicting a conversion rate of a provider-publisher pair, reserving content slots within an information resource of a content publisher, providing actionable objects within a content slot of an information resource of a content publisher and automatically resizing a creative based on dimensions of a content slot. The various concepts introduced above and discussed in greater detail below may be implemented in any of numerous ways, as the described concepts are not limited to any particular manner of implementation.

Section A relates to methods, apparatuses and systems relating to predicting a conversion rate of a content publisher-third-party content provider pair.

Section B relates to methods, apparatuses and systems relating to reserving content slots within an information resource of a content publisher.

Section C relates to methods, apparatuses and systems relating to providing actionable objects within a content slot of an information resource of a content publisher.

Section D relates to methods, apparatuses and systems relating to automatically resizing a creative based on dimensions of a content slot.

Online content publishers that publish primary content on information resources, such as webpages and other documents, often generate revenues by selling space on the information resources to third-party content providers. The space, often referred to as content slots, can be configured to include third-party content (for instance, ads) provided by the creatives that purchased the space. Some content publishers utilize a third-party content placement management entity to manage the selling or utilization of the content slot when the information resource associated with the content slot is served. Typically, the management entity holds an auction to insert a creative in the content slot on an impression by impression basis. Via the auction, the management entity selects a creative of the highest bidder (for instance, a third-party content provider) and inserts the creative in the content slot for the given impression. Although the use of auctions is an efficient way for small content publishers to generate revenues via their information resources, larger, more established content publishers that receive a very large number of impressions may use a direct content placement campaign approach to increase revenues via their information resources.

In some implementations, the larger, more established content publishers may sell space on their information resources directly to third-party content providers at a premium instead of providing creatives that are selected via an auction. In this way, the most expensive, premium inventory which can result in the highest return on investment for a third-party content provider (for instance, an advertiser) is often sold on a direct basis, that is, as a result of an agreement on the price between the content publisher and the third-party content provider, as opposed to an online auction.

A. Predicting a Conversion Rate of a Content Publisher-Third-Party Content Provider Pair FIG. 1 illustrates an system 100 for predicting a conversion rate of a content publisher-third-party content provider pair via at least one computer network, such as the network 105. The network 105 can include computer networks such as the internet, local, wide, metro or other area networks, intranets, satellite networks, other computer networks such as voice or data mobile phone communication networks, and combinations thereof. The system 100 can also include at least one data processing system 110, e.g., at least one logic device such as a computing device or server having a processor to communicate via the network 105, for instance with at least one content provider computing device 115, at least one content publisher computing device 120, or at least one end user computing device 125.

The data processing system 110 can include at least one server. For instance, the data processing system 110 can include a plurality of servers located in at least one data center or server farm. In some implementations, the data processing system 110 includes a content placement system, e.g., an ad server or ad placement system. The data processing system 110 can include at least one content placement management module 130, at least one conversion rate model generation module 132, at least one, at least one conversion rate prediction module 134 and at least one database 140. The content placement management module 130, the conversion rate model generation module 132 and the conversion rate prediction module 134 can each include at least one processing unit, server, virtual server, circuit, engine, agent, appliance, or other logic device such as programmable logic arrays configured to communicate with the database 140 and with other computing devices (e.g., the content provider computing device 115, the content publisher computing device 120, or the end user computing device 125) via the network 105.

The content placement management module 130, the conversion rate model generation module 132 and the conversion rate prediction module 134 can include or execute at least one computer program or at least one script. The content placement management module 130, the conversion rate model generation module 132 and the conversion rate prediction module 134 can be separate components, a single component, or part of the data processing system 110. The content placement management module 130, the conversion rate model generation module 132 and the conversion rate prediction module 134 can include combinations of software and hardware, such as one or more processors configured to execute one or more scripts to obtain requests to initiate a content item placement campaign, identify information resources of the content publisher computing device 120, provide a rendering of the information resource at the content provider computing device, identify content item slots (e.g., ad slots or ad units) of the information resource, provide content items for display in the rendering of the information resource, or receive authorization to provide content items for display with the information resource at the end user computing device 125, for instance.

The content provider computing devices 115 can include servers or other computing devices operated by a content provider entity to provide content items such as advertisements for display on information resources at the end user computing device 125. The content provided by the content provider computing device 115 can include third party content items (e.g., ads) for display on information resources such as a website or web page that includes primary content, e.g. content provided by the content publisher computing device 120. The content items can also be displayed on a search results web page. For instance, the content provider computing device 115 can provide or be the source of ads or other content items for display in content slots of content web pages such as a web page of a company where the primary content of the web page is provided by the company, or for display on a search results landing page provided by a search engine. The content items associated with the content provider computing device 115 can be displayed on information resources other than web pages, such as content displayed as part of the execution of an application on a smartphone or other end user computing device 125.

The content publisher computing devices 120 can include servers or other computing devices operated by a content publishing entity to provide primary content for display via the network 105. For instance, the content publisher computing device 120 can include a web page operator who provides primary content for display on the web page. The primary content can include content other than that provided by the content publisher computing device 120, and the web page can include content slots configured for the display of third party content items (e.g., ads) from the content provider computing devices 115. For instance, the content publisher computing device 120 can operate the website of a company and can provide content about that company for display on web pages of the website. The web pages can include content slots configured for the display of third party content items such as ads of the content provider computing device 115. In some implementations, the content publisher computing device 120 includes a search engine computing device (e.g. server) of a search engine operator that operates a search engine website. The primary content of search engine web pages (e.g., a results or landing web page) can include results of a search as well as third party content items displayed in content slots such as content items from the content provider computing device 115.

The end user computing devices 125 can include computing devices configured to communicate via the network 105 to display data such as the content provided by the content publisher computing device 120 (e.g., primary web page content or other information resources) and the content provided by the content provider computing device 115 (e.g., third party content items such as ads configured for display in a content slot of a web page). The end user computing device 125, the content provider computing device 115, and the content publisher computing device 120 can include desktop computers, laptop computers, tablet computers, smartphones, personal digital assistants, mobile devices, end user computing devices, consumer computing devices, servers, clients, and other computing devices. The end user computing device 125, the content provider computing device 115, and the content publisher computing device 120 can include user interfaces such as microphones, speakers, touchscreens, keyboards, pointing devices, a computer mouse, touchpad, or other input or output interfaces.

The data processing system 110 can include a content placement management module 130, a conversion rate model generation module 132 and a conversion rate prediction module 134. The data processing system 110 can be configured to identify, from log data, a plurality of content publisher-provider pairs, determine, for each content publisher-provider pair, from the log data, a conversion rate, determine, for each content publisher-provider pair, feature data of the content publisher and feature data of the third-party content provider and transform the determined feature data of the content publishers and third-party content providers and the conversion rates of the plurality of content publisher-provider pairs into a model useful for predicting a conversion rate of a given content publisher-provider pair different from the identified plurality of content publisher-provider pairs.

In some implementations, the data processing system 110 can be configured to identify pairings of third-party content providers and content publishers to establish a relationship in which the third-party content provider can provide content to insert within content slots of information resources of the content publisher. In some implementations, the data processing system 110 can identify the pairings using log data associated with content items of third-party content providers that have been served on information resources of content publishers In some implementations, the data processing system 110 may identify the pairings by generating a conversion rate prediction model that can predict a conversion rate of creatives provided by the third-party content provider when served on information resources of the content publisher. In this way, the data processing system 110 can generate a list of candidate content publishers to a third-party content provider seeking information resources on which to serve creatives. Conversely, the data processing system 110 can generate a list of candidate third-party content providers to a content publisher seeking creative to serve within content slots of information resources of the content publisher.

The content placement management module 130 can be part of, or can include scripts executed by, one or more servers in the data processing system 110. In some implementations, the content placement management module 130 can aggregate and maintain log data. In some implementations, another module or system can aggregate or maintain the log data and communicate the log data to the content placement management module 130. In some implementations, the content placement management module 130 can store the log data in a database, such as the database 140 of the data processing system 110.

In some implementations, the content placement management module 130 can be configured to update the log data each time a creative is served on an information resource. In some implementations, the content placement management module 130 can create a new entry for each creative that is served. In some implementations, the content placement management module 130 can be configured to maintain log data for creative that are served in content slots that are tagged. The content placement management module 130 can be configured to monitor the tagged content slots. In some implementations, the content placement management module 130 can be configured to receive a request to insert a creative in a content slot responsive to a request to provide the information resource associated with the content slot for display. The content slot or information resource can include a script or some other software construct that allows the content placement management module 130 to receive requests to insert creatives in content slots. In some implementations, the content placement management module 130 can provide the creative to insert in the content slot each time a request to serve an information resource is made by an end user computing device. In some implementations, the content placement management module 130 can provide the creative to the content publisher along with one or more rules indicating when to serve the creative. In some such implementations, the content placement management module 130 can be configured to determine how many times a particular creative has been served along with other information that can be used to create entries for the log data.

The log data can include activity information relating to one or more creatives when served on one or more information resources. In some implementations, serving a creative on an information resource can entail inserting the creative in a content slot of the information resource and providing the information resource including the creative for display at an end user computing device, such as the end user computing device 125. Activity information can correspond to the serving of a creative, a conversion of a creative, and so forth. A creative can receive an impression when the creative is served on an information resource. A creative can receive a conversion when a predefined action is taken on the creative when the creative is served on the information resource. A predefined action can include a click, an actuation of the creative, a purchase made through the creative, providing information through the creative, signing up for an account through the creative, amongst others.

The log data can include a plurality of entries, each of which corresponds to activity information related to a single impression of a creative. In some implementations, an entry can include information identifying the information resource (for instance, the webpage) and the website associated with the information resource. The entry can also include information identifying a particular third-party content slot of the information resource in which the creative was inserted. In some implementations, the entry can identify a type of third-party content slot, for instance, if the content slot was a leaderboard, skyscraper, or bottom of page content slot. The entry can also include information identifying the third-party content provider, for instance, by a domain name of the landing page associated with the creative. In some implementations, the third-party content provider can be identified based on the content of the creative. In some implementations, the entry can also include a cost for receiving an impression. In some implementations, the cost can be cost per thousand impressions (CPM), cost per click, amongst others.

In some implementations, the entry can also include information relating to any activity taken on the creative. For instance, the entry can include information indicating whether the creative was actuated (clicked on, hover over, etc.). In some implementations, the entry can include information relating to a conversion of the creative. For instance, the entry can include information indicating a transaction has been performed, an amount of the transaction, signing up for an account, providing information, amongst others.

In some implementations, the content placement management module 130 can only aggregate and maintain log data for creatives served on content publishers that have voluntarily opted to allow the content placement management module to aggregate the log data. Moreover, the content placement management module 130 can only aggregate and maintain log data for creatives inserted in content slots of information resources of content publishers that the content publishers have voluntarily opted to allow the content placement management module to aggregate the log data.

The content placement management module 130 can be configured to identify, from the log data, a plurality of content publisher-provider pairs. In some implementations, each of the plurality of content publisher-provider pairs can correspond to a third-party content provider associated with at least one creative receiving at least one conversion when served on one or more information resources of the content publisher. In some implementations, each of the plurality of content publisher-provider pairs can correspond to a third-party content provider associated with at least one creative receiving at least one impression when served on one or more information resources of the content publisher.

In some implementations, the content placement management module 130 can be configured to identify a plurality of content publisher-provider pairs from a portion of the log data. In some implementations, the portion of log data used for the analysis can be filtered by one or more content publishers, one or more third-party content providers, or a combination of content publishers, third-party content providers. In some implementations, the portion of log data used for the analysis can be limited by geography, time, type of device of the end user computing device on which the information resources are served, amongst others. In some implementations, the content placement management module 130 can only identify content publisher-provider pairs associated with creative that received a conversion within a predetermined time frame, for instance, a day, a week, a month or a year, amongst others. In some implementations, the content placement management module 130 may only analyze log data corresponding to creative receiving impressions within a predetermined time frame, for instance, a day, a week, a month, a year, amongst others.

The content placement management module 130 can identify the plurality of content publisher-provider pairs by analyzing the log data. In some implementations, the content placement management module 130 can identify a first entry of the log data in which a creative associated with the first entry received a conversion. The content placement management module 130 can identify a content publisher of the information resource including the content slot in which the creative was inserted. The content placement management module 130 can also identify a third-party content provider associated with the creative. The content placement management module 130 can then identify, for the content publisher-provider pair, other entries within the log data in which any creative of the identified third-party content provider received an impression when served on any information resource associated with the identified content publisher. The content placement management module 130 can then determine, from the identified entries, a total number of impressions received by the creatives of the third-party content provider when served on the one or more information resources of the identified content publisher. The content placement management module 130 can then determine, from the identified entries, a total number of conversions associated with the creatives that received impressions. The content placement management module 130 can determine the total number of conversions by identifying, from the identified entries of the data log, the number of entries that resulted in a conversion. The content placement management module 130 can then determine a conversion rate corresponding to the content publisher-provider pair by determining a ratio of the total number of conversions associated with the creatives that received impressions to the total number of impressions received by the creatives of the provider when served on the one or more information resources of the content publisher.

In some implementations, the content placement management module 130 can recursively identify, from the log data, a plurality of content publisher-provider pairs. In some implementations, the content placement management module 130 can identify a second entry of the log data that corresponds to a creative associated with a second content publisher-provider pair that is different from the first content publisher-provider pair and also corresponds to receiving a conversion. The content placement management module 130 can then identify all entries in the log data that correspond to the second content publisher-provider pair and determine the conversion rate corresponding to the second content publisher-provider pair. In this manner, the content placement management module 130 can identify a plurality of different content publisher-provider pairs, each of which having at least one creative that received a conversion when served on an information resource The conversion rate model generation module 132 can be part of, or can include scripts executed by, one or more servers in the data processing system 110. The conversion rate model generation module 132 can be part of the same or a different server as the content placement management module 130 in the data processing system 110. The conversion rate model generation module 132 can be configured to generate a conversion rate prediction model. To do so, the conversion rate model generation module 132 can be configured to determine the conversion rates corresponding to each of the content publisher-provider pairs identified by the content placement management module 130.

In some implementations, the conversion rate for a content publisher-provider pair can be a click through rate. In some implementations, the conversion rate model generation module 132 can determine the click-through rate by calculating a ratio of a number of clicks on one or more creatives of the third-party content provider that received an impression when served on one or more information resources of the content publisher to a total number of impressions received by the creatives of the third-party content provider when served on the information resources of the content publisher. In some implementations, to determine the conversion rate, the conversion rate model generation module 132 can determine, from the log data, a total number of impressions received by a plurality of creatives of the third-party content provider on a plurality of information resources of the content publisher. In some implementations, the conversion rate model generation module 132 can first identify all entries included in the log data in which any creative of the third-party content provider received an impression when served on any information resource of the content publisher. The conversion rate model generation module 132 can then determine a total number of conversions received by the creatives of the third-party content provider that received an impression when served on any information resources of the content publisher. The conversion rate model generation module 132 can then determine a ratio of the total number of conversions to the total number of impressions. In some implementations, a conversion can be identified as a purchase, subscribing to an email list, or taking a specified action, amongst others.

The conversion rate model generation module 132 can be configured to determine, for each identified content publisher-provider pair, feature data for the content publisher of the content publisher-provider pair. The feature data for the content publisher can be based on one or more features, including content included in the information resources of the content publisher, the language in which the content included in the information resources is published, the geo-locality associated with the content included in the information resources, amongst others. In some implementations, the feature data can be represented as a feature vector in a multi-dimensional space. In some implementations, each dimension of the feature vector can correspond to one or more topics associated with content included in the information resources, the language in which the content is published, the geo-locality associated with the content and the content publisher, amongst others. In some implementations, the feature vector can be weighted such that topics associated with content in information resources that included creatives that received a lot of conversions receive a greater weight than topics that are associated with content included in information resources that included creative that received fewer conversions. In some implementations, clustering can be used to determine topics of content included in the information resources of a content publisher. These topics can be used to determine feature data.

The conversion rate model generation module 132 can also be configured to determine, for each content publisher-provider pair, feature data for the third-party content provider of the content publisher-provider pair. The feature data for the provider can be based on one or more features, including content included in the creative of the third-party content provider and the content included in information resources of the third-party content provider. In some implementations, the information resources of the third-party content provider include the landing pages of the creative. In some implementations, the information resources of the third-party content provider include other web pages associated with the website of the third-party content provider. The feature data can also be based on the language in which the content included in the creatives and information resources of the provider are published, the geo-locality associated with the content included in the information resources of the provider, amongst others. In some implementations, the feature data of the provider can also be represented as a feature vector in a multi-dimensional space. In some implementations, each dimension of the feature vector can correspond to one or more of topics associated with content included in the information resources, the language in which the content is published, the geo-locality associated with the content and the content publisher, amongst others.

The conversion rate model generation module 132 can be configured to transform the aggregate feature data of the content publishers, the feature data of the third-party content providers and the determined conversion rates of the content publisher-provider pairs to a conversion rate prediction model. The conversion rate prediction model is a model to predict a conversion rate of a creative of a third-party content when served on an information resource of a content publisher. The conversion rate prediction model can also be used to assess a quality of a particular content publisher-provider pair, rank existing content publisher-provider pairs according to their associated conversion rates, and identify new content publisher-provider pairs likely to be successful based on their predicted conversion rates.

In some implementations, the conversion rate model generation module 132, for each content publisher-provider pair, can determine a linear relationship between a content publisher g and the third-party content provider a. In some implementations, the conversion rate model generation module 132 can determine a feature vector $\omega=\Phi(g)$ of the content publisher g and a feature vector $\delta=\Phi(a)$ of the third-party content provider a. In some implementations, the conversion rate model generation module 132 may assume that a relationship between the third-party content provider a and the content publisher g can be represented as a linear relationship between corresponding features. In some implementations, the conversion rate model generation module 132 can rely on the Bayesian assumption, that is, the presence or absence of any j-th feature will not affect presence or absence of i-th feature of the feature vector. The cumulative differences between specific features of the third-party content provider a and the content publisher g can correspond to a quality of the placement p(g, a), as well as a quality score E(g, a) of the placement p(g, a) indicating a measure of quality. The quality score can be loosely expressed according to the following:

$$E(g,a) \sim E'(g,a) = \Sigma \alpha_i [\delta_i - \omega_i]$$

Here, the difference between specific features $\delta_i - \omega_i$ can be the explanatory variables and E' can be a dependent variable of the multiple linear regression. Multiple linear regression attempts to model the relationship between two or more explanatory variables and a response variable by fitting a linear equation to observed data. Since $E \sim E'$, for scoring purposes, the content placement management module 130 can use E' as a substitute for unknown E. For the purpose of regression, the conversion rate model generation module 132 can consider all pairwise combinations of content publisher-provider pairs (g, a) as a single explanatory variable $X_{g,a}$ expressed as follows:

$$X_{g,a} = \begin{pmatrix} \delta_1 \\ \ldots \\ \delta_n \\ \omega_1 \\ \ldots \\ \omega_n \end{pmatrix}$$

The goal of linear regression is to find a coefficient $\beta$ that $E'(g, a) = X_{g,a}\beta$. To achieve this, the conversion rate model generation module 132 can be configured to calculate features for every content publisher g and third-party content provider a, and produce pairwise linear regressions for every content publisher-provider pair that corresponds to a creative of the third-party content provider receiving a conversion when served on an information resource of the content publisher. As described above, the conversion rate model generation module 132 can further be configured to determine the existing conversion rates for each content publisher-provider pair and use the determined conversion rates to train the linear regression. With the linear regression fully trained, the conversion rate prediction model can be used to predict conversion rates and identify potential pairings of content publishers and third-party content providers.

In some implementations, the conversion rate model generation module 132 can be configured to generate a conversion rate prediction model that relies on a nonlinear regression. Nonlinear regression is a form of regression analysis in which observational data are modeled by a function which is a nonlinear combination of the model parameters and depends on one or more independent variables. The data are fitted by a method of successive approximations.

The conversion rate prediction module 134 can be part of, or can include scripts executed by, one or more servers in the data processing system 110. The conversion rate prediction module 134 can be part of the same or a different server as the content placement management module 130 and the conversion rate model generation module 132 in the data processing system 110. The conversion rate prediction module 134 can be configured to score existing content publisher-provider pairs based on their predicted conversion rates. In addition, the content placement management module 130 can use the predicted conversion rates to provide, to a third-party content provider, an evaluation of the third-party content provider's existing pairings with content publishers as well as to identify new content publishers with whom the third-party content provider has not yet established a pairing.

In some implementations, the conversion rate prediction model 134 can be used for predicting a conversion rate of a given content publisher-provider pair different from the identified plurality of content publisher-provider pairs. In some implementations, the conversion rate prediction model 134 can be configured to receive, from a third-party content provider, a request for a list of content publishers having at least one information resource on which to serve creatives. In some implementations, the conversion rate prediction model 134 can determine the feature data of the third-party content provider requesting the list of content publishers. The conversion rate prediction model 134 can then identify a plurality of candidate content publishers on which creatives of the third-party content provider can be served. In some implementations, the conversion rate prediction model 134 can identify a plurality of candidate content publishers on which creatives of the third-party content provider can be served from a list of content publishers that have authorized the data processing system 110 to facilitate the placement of creatives in content slots on behalf of the content publisher. In some implementations, the conversion rate prediction model 134 can first identify all of the content publishers for which conversion rate data is available. The conversion rate prediction model 134 then determines the feature data of each of the identified content publishers. The conversion rate prediction model then provides the feature data of the identified content publishers and the content provider requesting the list to the conversion rate prediction model to determine the predicted conversion rates of each of the identified content publishers. The conversion rate prediction model 134 can then rank the content publisher-provider pairings according to their conversion rate predictions and provide a subset of the content publisher-provider pairings to the content provider. In some implementations, the subset can include a predetermined number of content publisher-provider pairings. In some implementations, the predetermined number can range anywhere from 1-50 content publisher-provider pairings. In some implementations, the subset can include any number of content publisher-provider pairings that have a predicted conversion rate above a particular threshold. The threshold value can range anywhere from at least 1% up to 70%.

Figure 2:
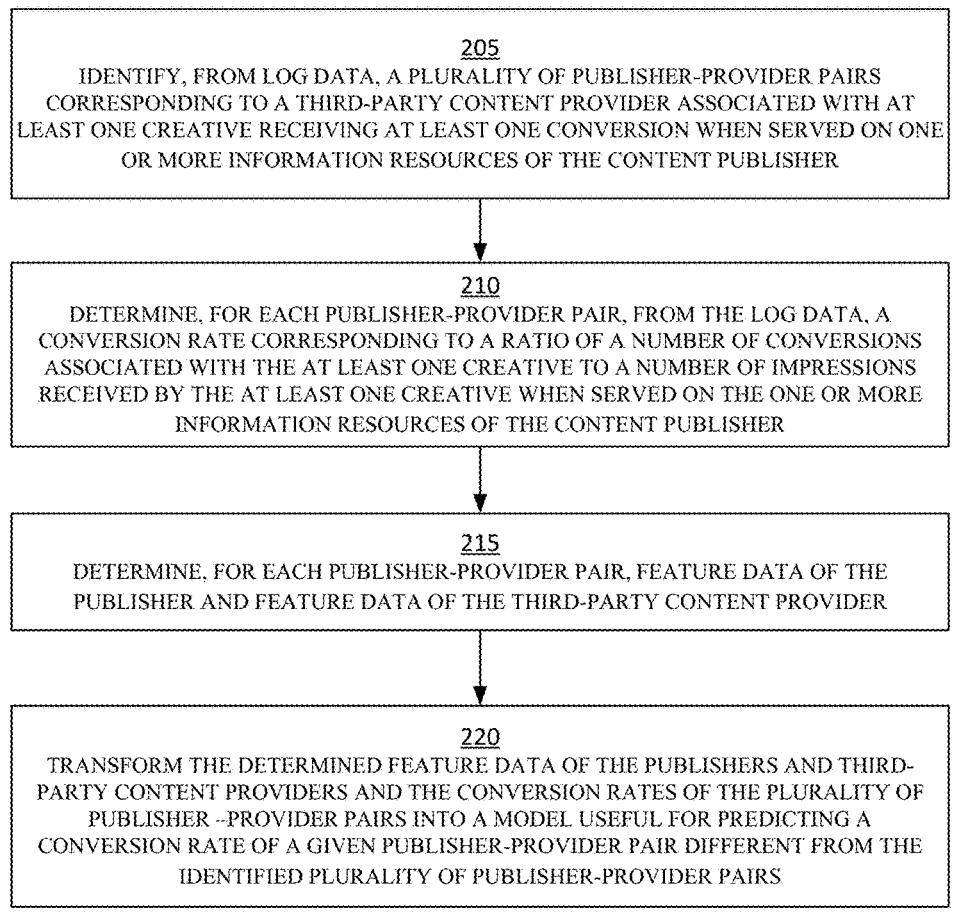
FIG. 2 is a flow diagram depicting an method of predicting a conversion rate of a content publisher-third-party content provider pair, according to an illustrative implementation.

FIG. 2 is a flow diagram depicting an method 200 of predicting a conversion rate of a content publisher-third-party content provider pair. The method 200, via a processor of a data processing system, such as the data processing system 100 shown in FIG. 1, can identify, from log data, a plurality of content publisher-third-party content provider pairs, each corresponding to a third-party content provider associated with at least one creative receiving at least one conversion when served on one or more information resources of the content publisher (Block 205). The method can determine, for each content publisher-provider pair, from the log data, a conversion rate corresponding to a ratio of a number of conversions associated with the at least one creative to a number of impressions received by the at least one creative when served on the one or more information resources of the content publisher (Block 210). The method can determine, for each content publisher-provider pair, feature data of the content publisher and feature data of the third-party content provider (Block 215). The method can also transforming the determined feature data of the content publishers and third-party content providers and the conversion rates of the plurality of content publisher-provider pairs into a model useful for predicting a conversion rate of a given content publisher-provider pair different from the identified plurality of content publisher-provider pairs (Block 220).

In further detail, the method 200 can identify, from log data, a plurality of content publisher-third-party content provider pairs (Block 205). In some implementations, each of the plurality of content publisher-provider pairs can correspond to a third-party content provider associated with at least one creative receiving at least one conversion when served on one or more information resources of the content publisher. In some implementations, the log data includes activity information relating to one or more creatives provided for display along with primary content on an information resource. The log data can include a plurality of entries, each of which corresponds to activity information related to a single impression of a creative. In some implementations, an entry can include information identifying the information resource (for instance, the webpage) and the website associated with the information resource. The entry can also include information identifying a particular third-party content slot in which the creative was inserted. In some implementations, the entry can identify a type of third-party content slot, for instance, if the content slot was a leaderboard, skyscraper, or bottom of page content slot. The entry can also including information identifying the third-party content provider, for instance, by a domain name of the landing page associated with the creative. In some implementations, the third-party content provider can be identified based on the content of the creative. In some implementations, the entry can also include a cost for receiving an impression. In some implementations, the cost can be cost per thousand impressions (CPM), cost per click, amongst others. In some implementations, the entry can also include information relating to any activity taken on the creative. For instance, the entry can include information indicating whether the creative was actuated (clicked on, opened, etc.).

In some implementations, the method can maintain the log data of all creatives served on an information resource of a participating content publisher. In some implementations, the method can identify a list of content publishers that participate in direct content placement via a content placement management system, such as the data processing system 110 shown in FIG. 1. The data processing system can facilitate the placement or insertion of creatives in content slots of information resources of a content publisher on behalf of the content publisher. In some implementations, the data processing system may obtain permission or consent from the content publisher to manage the inventory of content slots included in information resources of the content publisher. The inventory of content slots that can be managed by the data processing system can be identified by a tag, or other identification mechanism. In this way, the content publisher can utilize the data processing system to facilitate the placement of creatives in content slots tagged or identified as content slots configured to be managed by the data processing system. Other content slots that may be included in one or more information resources of the content publisher that are not tagged or otherwise identified may be configured to receive creatives using other content placement methods. Instances of other content placement methods include content placement auctions or inserting content through an existing contractual relationship formed between the content provider and the content publisher, amongst others.

In some implementations, the data processing system can monitor activity at one or more information resources of the content publisher. The data processing system can monitor visits to each information resource. In some implementations, the data processing system can create entries in response to the information resource being provided for display to an end user computing device. Each entry can include information relating to an end user computing device, such as a location of the computing device, a time of access, an amount of time spent on the information resource, a resource (for instance, webpage, direct visit, creative, search result) through which the end user computing device arrived at the information resource, and a resource through which the end user computing device exited the information resource, amongst others.

The method can determine, from the log data, a conversion rate for each content publisher-third-party content provider pair (Block 210). In some implementations, the conversion rate for a content publisher-third-party content provider pair can be a click through rate. In some implementations, the click-through rate can be determined by calculating a ratio of a number of clicks on one or more creatives of the third-party content provider provided for display on an information resource of the content publisher to a total number of impressions received by the one or more creatives of the third-party content provider provided for display on the resource of the content publisher. In some implementations, to determine the conversion rate, the method can determine, from the log data, a total number of impressions received by creatives of the third-party content provider served on one or more information resources of the content publisher. In some implementations, the method can first identify all entries included in the log data in which any creative of the third-party content provider received an impression when served on any information resource of the content publisher. The method can determine a total number of conversions received by the creative of the third-party content provider when served on any information resource of the content publisher. The method can then determine a ratio of the total number of conversions to the total number of impressions. In some implementations, the conversions can be identified as click throughs. In some implementations, a conversion can be identified as a purchase, subscribing to an email list, or taking a specified action, amongst others.

The method can determine, for each content publisher-third-party content provider pair, feature data of the content publisher and feature data of the third-party content provider (Block 215). In some implementations, the method includes determining feature data of the content publisher and the third-party content provider based on one or more of topics of content included in the information resources of the content publisher and resources of the third-party content provider. In some implementations, the method can determine the feature data of an information resource of the content publisher using the content included in the information resource. In some implementations, the method can determine the feature data using clustering. In some implementations, the method can determine the feature data using other well-known methods for feature data determination. For instance, the feature data can be based on the geo-locality of the end user computing devices accessing the information resource In some implementations, the feature data can be based on a language in which h the content of the information resource is published.

In some implementations, the method can determine the feature data of the content publisher by determining one or more feature vectors for the content publisher having multiple dimensions. In some implementations, each of the dimensions can correspond to different features of the content publisher. Similarly, in some implementations, the method can determine the feature data of the third-party content provider by determining one or more feature vectors for the third-party content provider having multiple dimensions. In some implementations, each of the dimensions can correspond to different features of the third-party content provider.

The method can also generate a model for predicting a conversion rate of a given content publisher-third-party content provider pair using the determined feature data of the content publisher, the determined feature data of the third-party content provider and the determined conversion rates of the plurality of content publisher-third-party content provider pairs (Block 220).

In some implementations, the method can identify a candidate content publisher-third-party content provider pair different from the identified plurality of content publisher-third-party content provider pairs. The method can identify a candidate content publisher-third-party content provider pair responsive to a request from a third-party content provider to identify potential content publishers on whose information resources the third-party content provider can provide creatives to serve. Conversely, The method can identify a candidate content publisher-third-party content provider pair responsive to a request from a content publisher to identify potential third-party content providers having a predicted conversion rate above a threshold predicted conversion rate. In some implementations, the threshold predicted conversion rate may be based on a current conversion rates of the provider-publisher pairings of which the third-party content provider is a part.

In some implementations, the method can receive, from a third-party content provider, a request for a list of content publishers having at least one resource on which to serve creatives. In some implementations, the method can further determine feature data of the third-party content provider requesting the list of content publishers. The method can then identify a plurality of candidate content publishers on which creatives of the third-party content provider can be served. In some implementations, the method can identify a plurality of candidate content publishers on which creatives of the third-party content provider can be served from a list of content publishers that have authorized the method to facilitate the placement of creatives in content slots on behalf of the content publisher.

The method can then determine feature data of the identified plurality of content publishers and determine, using the generated model, for each of the plurality of candidate content publishers and the third-party content provider associated with the request, a predicted conversion rate of the content publisher-third-party content provider pair based on the feature data of the candidate content publisher and feature data of the third-party content provider.

The method can provide, to the third-party content provider requesting the list of content publishers, the list of content publishers having at least one information resource including a content slot in which to serve creatives. The list can include the plurality of candidate content publishers and the determined predicted conversion rate of the content publisher-third-party content provider pair.

In some implementations, the method can receive, from a content publisher, a request for a list of third-party content providers having at least one creative to serve on a resource of the content publisher. The method can then determine feature data of the content publisher. The method can identify a plurality of candidate third-party content providers having at least one creative to serve on a resource of the content publisher. The method can determine feature data of the identified plurality of candidate third-party content providers. The method can determine, using the generated model, for each of the plurality of candidate third-party content providers and the content publisher associated with the request, a predicted conversion rate of the content publisher-third-party content provider pair based on the feature data of the candidate content publisher and feature data of the third-party content provider.

The method can provide, to the content publisher, the list of third-party content providers having at least one creative to serve on a resource of the content publisher. The list can include the plurality of candidate third-party content providers and the determined predicted conversion rate of the content publisher-third-party content provider pair.

B. Reserving Content Slots of an Information Resource of a Content Publisher

Figure 3:
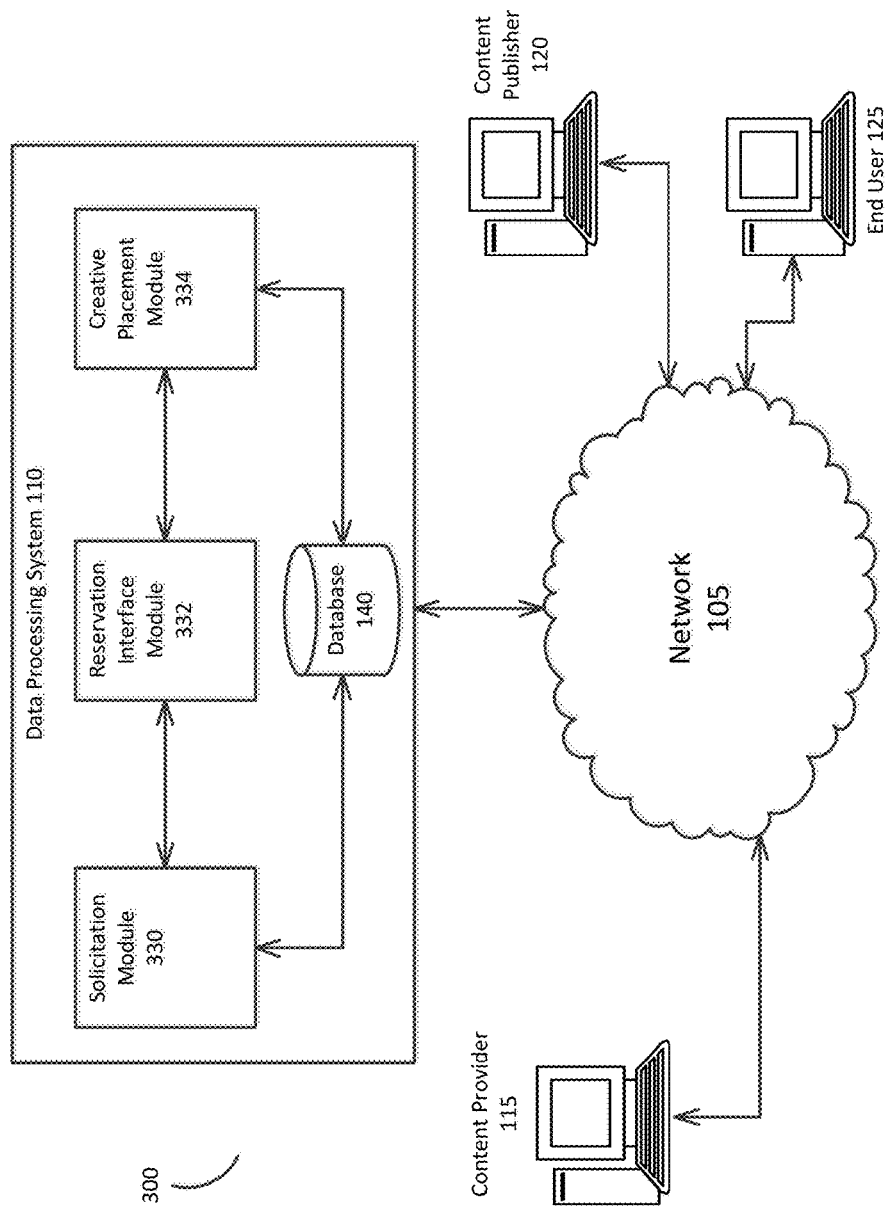
FIG. 3 is a block diagram depicting one environment to reserve a particular third-party content slot of an information resource of a content publisher, according to an illustrative implementation.

FIG. 3 illustrates an system 300 for reserving a content slot of an information resource of a content provider via at least one computer network, such as the network 105. The system 300 can include one or more components of the system 100 shown in FIG. 1. The system 300 includes the data processing system 110 shown in FIG. 1, but includes additional modules configured to reserve a content slot of an information resource of a content provider.

The data processing system 110 can include a solicitation module 330, a reservation interface module 332 and a creative placement module 334. The data processing system 110 can be configured to receive, in response to an action taken on an actionable solicitation object (for instance, a link, icon, button, creative) included within an information resource of a content publisher, a request to receive information for inserting a creative within one or more third-party content slots available on the information resource in accordance with a direct content placement campaign. In a direct content placement campaign, a third-party content provider can reserve at least one content slot of an information resource of a content publisher to insert a creative according to a reservation policy. The reservation policy can include one or more rules outlining a schedule according to which the creative can be inserted in the content slot. The data processing system 110 can be configured to provide, for display, an interface that includes the information regarding reserving at least one content slot. Stated in another way, the information can be related to inserting the creative within one or more third-party content slots on the information resource of the content publisher. The data processing system 110 can be configured to receive, via the interface, a request to insert, according to a reservation policy, a creative within a particular third-party content slot of the plurality of third-party content slots when the information resource on which the particular third-party content slot is located is served. The data processing system 110 can be configured to store data associated with the request to insert the creative within the particular third-party content slot. The stored data can be useful to provide, for display, the creative within the particular third-party content slot of the information resource when the information resource is served in accordance with the reservation policy.

The solicitation module 330 can be part of, or can include scripts executed by, one or more servers in the data processing system 110. In some implementations, the solicitation module 330 can be configured to solicit third-party content providers to reserve one or more content slots of an information resource to insert creatives when the information resource is served. The solicitation module 330 can be configured to identify a content publisher that has indicated an interest in utilizing the data processing system 110 to provide creatives for insertion in one or more content slots of the information resources of the content publisher via a direct content placement campaign of a content provider. In some implementations, the solicitation module 330 can identify a content publisher in response to receiving a request from the content publisher to utilize one or more content slots for serving creatives of content providers participating in direct content placement campaigns. In some implementations, the solicitation module 330 can identify a content publisher based on an analysis of traffic related information associated with the content publisher. For instance, content publishers that satisfy a minimum traffic metric threshold may be identified as candidate content publishers that may be eligible or willing to participate in providing content slots for serving creatives of content providers participating in direct content placement campaigns. Instances of traffic metrics include an average daily number of visits, an average number of unique visitors, or any other metric that provides an indication of a popularity of an information resource. In addition, the solicitation module 330 can receive information relating to creatives served in content slots of the information resources, including but not limited to the identity of the creatives served, the third-party content providers associated with the creatives, the number of clicks received by the creatives, the number of conversions received by the creatives, amongst others. In some implementations, the solicitation module 330 can be configured to allow content publishers participating in a content placement service to opt-in to participate in providing content slots for serving creatives of content providers participating in direct content placement campaigns.

The solicitation module 330 can be configured to provide, on an information resource of a content publisher, a solicitation object through which a potential third-party content provider accessing the information resource, can actuate the solicitation object to participate in a direct content placement campaign that involves serving creatives on the information resource on which the solicitation object was provided. The solicitation object can be an actionable object, such as a link, an icon, a button, or any other object that a potential content provider can actuate.

In some implementations, the solicitation module 330 can provide the solicitation object within a solicitation creative that is served within a content slot of the information resource. In some implementations, the solicitation creative can be generated using traffic metrics associated with the information resource. In some implementations, the solicitation object can be provided for display within an area of the information resource where primary content is displayed.

The solicitation module 330 can provide the solicitation object on an information resource of a content publisher that has opted in to participate in providing content slots for serving creatives of content providers participating in direct content placement campaigns. In some implementations, for the information resource to be able to display the solicitation object, the solicitation module 330 can be configured to embed a script in the information resource of the content publisher. In some implementations, the solicitation module 330 can provide the script to the content publisher, who can insert the script in the information resource. In some implementations, the script can be configured to enable the data processing system 110 to retrieve information related to the one or more information resources of the content publisher. For instance, the script can be configured to allow the solicitation module 330 to receive traffic related statistics of the content publisher. In some implementations, the solicitation module can be configured to maintain log data relating to each visit to the information resources of the content publisher. In this way, the solicitation module 330 can be configured to create a data log based on visits to the information resources by end user computing devices and determine traffic metrics, such as an average daily number of visits, an average number of daily unique visitors, types of visitors visiting the site, amongst others. In some implementations, the script can be a snippet of code. In some implementations, the snippet of code is a JavaScript object.

In some implementations, the script of the solicitation module 330 can be configured to allow the solicitation module 330 to manage reservations for one or more content slots of the information resource. In some implementations, the solicitation module can, via the execution of the script, identify one or more content slots. The solicitation module 330 can identify content slots by parsing the contents or source code of the information resource. In some implementations, the solicitation module 330 can receive a request from the content publisher identifying particular content slots included in the information resources of the content publisher that the content publisher would like the solicitation module 330 to manage reservations. In some implementations, the request can include a request to manage the reservations of all of the content slots of all the information resources of the content publisher. In some implementations, the request can include a request to manage the reservations of all of the content slots of a particular information resource of the content publisher. In some implementations, the request can identify the content slots that the content publisher would like the data processing system 110 to manage. In some implementations, the content publisher can submit the request via a content slot management interface. In some implementations, the content publisher can select, via the user interface, one or more content slots to be managed by the data processing system 110.

The solicitation module 330 can, via the execution of the script, identify one or more of the identified content slots to be managed by the solicitation module 330. The solicitation module can identify the one or more of the identified content slots to be managed by the solicitation module 330 in response to receiving a request from the content publisher indicating the content slots to manage. In some implementations, the content publisher can identify one or more content slots by identifying any tags associated with the content slots. In some implementations, the content publisher may request the solicitation module 330 to manage all content slots that are tagged to request creatives from the data processing system 110. In some implementations, the solicitation module 330 may be configured to tag or otherwise identify content slots for which the content publisher would like the solicitation module 330 to manage reservations. In some implementations, the solicitation module 330 can tag or otherwise mark or identify the content slots to be managed by the solicitation module 330.

The solicitation module 330 can, via the execution of the script, then create reservation schedules for each of the content slots identify as content slots to be managed by the solicitation module 330. The reservation schedule of a content slot is a schedule indicating the availability of the content slot. When a content slot is reserved for a given period of time, the reservation schedule is updated to indicate that the content slot is reserved for the given period of time. In this way, third-party content providers interested in reserving the content slot are only able to reserve time slots during which the reservation schedule of the content slot indicates that the content slot is available.

In some implementations, the solicitation module 330 can be configured to analyze the information resources of the content publisher and identify all content slots configured to serve third-party content items. The solicitation module 330 can further be configured to tag, label, or otherwise modify the identified content slots such that the solicitation module 330 can be configured to manage the reservation of the content slots, while also being able to manage the content capable of being inserted in the identified content slots. In some implementations, the solicitation module 330 can modify the content slots such that only the data processing system 110 can provide content for insertion in the content slots when rendered on an end user computing device, such as the end user computing device 125.

Figure 4:
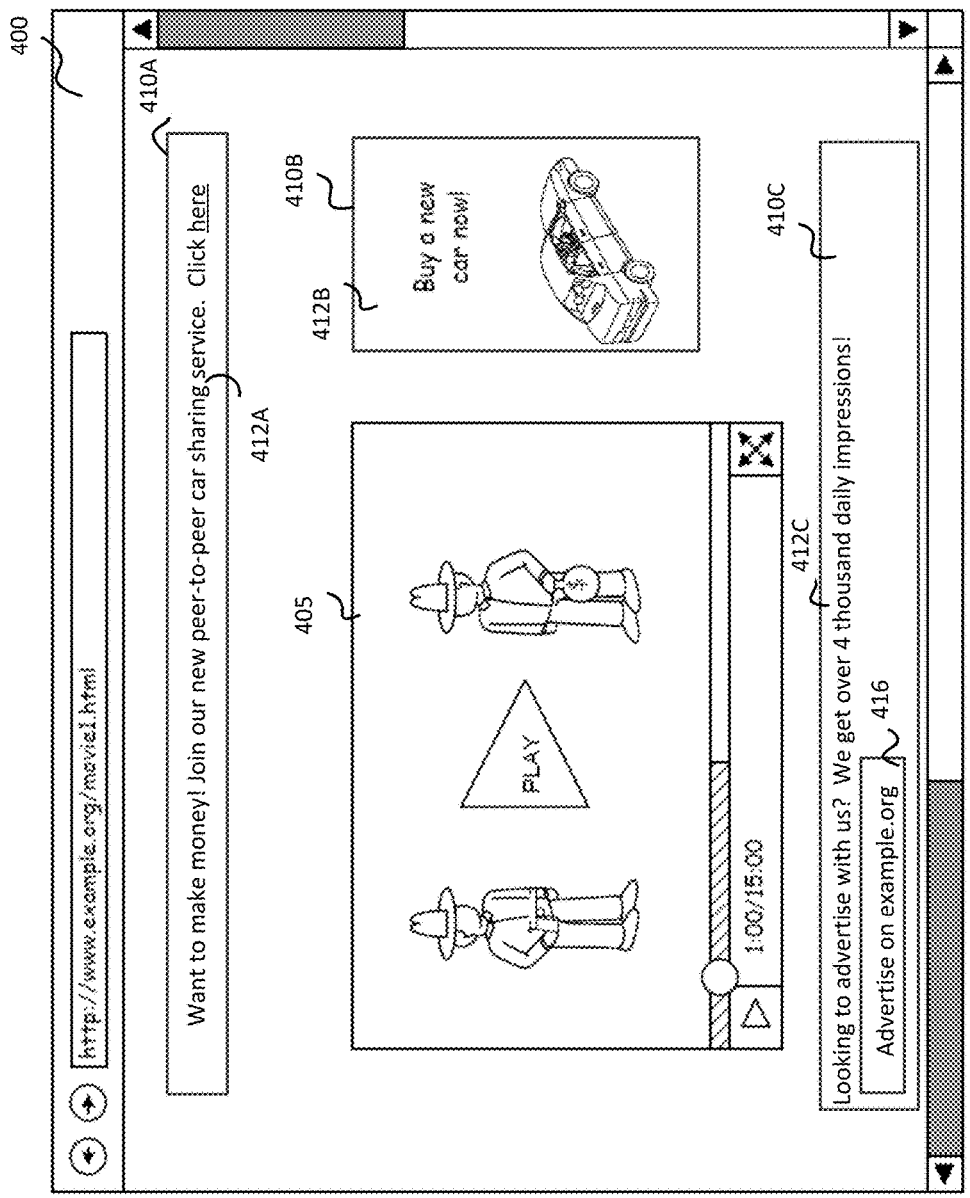
FIG. 4 is a display depicting an information resource, according to an illustrative implementation.

Referring briefly to FIG. 4, FIG. 4 is a display depicting an information resource, according to an illustrative implementation. The information resource 400 can be associated with or hosted by the content publisher computing device 120 and displayed by the content provider computing device 115 or by the end user computing device 125. For instance, the content publisher computing device 120 can include a web server that hosts the information resource 400 (e.g., a web page). The information resource 400 can include first party content in at least one content publisher content area 405. Subject matter created by or associated with the host (or content publisher) of the web page can be displayed in the content area 405. For instance, the information resource 400 may include a video hosted by the content publisher computing device 120. A primary content provider (e.g., the entity who provided the video) can provide primary content for display as content in the content publisher content area 405.

The information resource 400 can also include at least one content slot 410A-410C (generally content slot 410). The content slots 410 can include areas of the information resource 400 configured for display of third party content, such as content items or creatives 412A-412C (generally creatives 412). In some implementations, one or more of the content slots 410 can be configured to include a creative that serves as a solicitation creative 412C. The solicitation creative 412C can solicit offers for third party content providers to advertise on the information resource 400. For instance, the solicitation creative 412C can include a display to the effect of "advertise here" or "your ad here" to alert content providers of the opportunity to provide their content items for display in the content item slots 410 of the information resource 400. As shown in FIG. 4, the solicitation creative 412C can be inserted within a content slot, such as the content item slot 410C. For instance, the data processing system 110 can provide the solicitation creative 412C for display in a content item slot 410. The solicitation creative 412C can include a solicitation object 416. The solicitation object 416 can be an actionable object on which an action can be taken. Instances of actions can include clicks, hover over, amongst others. The solicitation object 416 can be configured such that when an action is taken on the solicitation object 416, the data processing system receives a request to provide information for serving creatives in the one or more content slots 410.

The solicitation object 416 can include a button, link or other interface that, when actuated by a click or other input into the content provider computing device 115 where the information resource 400 is displayed causes transmission of a communication via the network 105 to the data processing system 110. This communication can indicate a request from the content provider computing device 115 to initiate a direct content item placement campaign to provide associated creatives for display in one or more content slots 410 of the information resource 400, or a request to preview what creatives associated with the content provider computing device 115 look like when displayed in the content slots 410 of that information resource 400. Thus, the content provider computing device 115 can browse information resources 400 available via the network 105 and can select specific information resources 400 as candidates for a direct content item placement campaign. This rendering or impression of the information resource 400 at the content provider computing device 115 can include creatives such as ads displayed in the content slots 410.

The layout, look, feel, or configuration of the information resources 400 can vary, and the information resource can include web pages, application displays, or other online documents configured for display on various end user computing devices 125 such as desktop computers, smartphones, or tablet computers. The information resource 400, content publisher content areas 405, content slots 410, and solicitation creatives 416 need not have the number, shape, layout or configuration as in FIG. 4. For instance, the content slots 410 can appear within the content publisher content area 405, or in the top, bottom, or side margins of the information resource 400, and the content slots 410 need not be square or quadrilateral.

Referring again to FIG. 3, the data processing system 110 includes the reservation interface module 332. The reservation interface module 332 can be part of, or can include scripts executed by, one or more servers in the data processing system 110. In some implementations, the reservation interface module 332 can be configured to provide, for display, a reservation interface through which a third-party content provider can reserve one or more content slots of information resources of a content publisher. The reservation interface module 332 can be configured to provide the reservation interface for display responsive to receiving a request to receive information for inserting a creative within one or more third-party content slots available on the information resource. In some implementations, the reservation interface module 332 can be configured to provide the reservation interface to a third-party content provider in response to the third-party content provider taking an action on an solicitation object provided for display on an information resource of the content publisher. For instance, the reservation interface module 332 may provide the reservation interface to a third-party content provider in response to the third-party content provider clicking on the solicitation object 416 provided for display on the information resource 400 shown in FIG. 4.

In some implementations, the reservation interface can be provided on or as an information resource of the data processing system 110. The reservation interface can be configured to allow a third-party content provider to reserve one or more content slots of one or more information resources of a content publisher. The reservation interface can be configured to provide information that a third-party content provider can benefit from when determining whether to reserve one or more content slots of an information resource.

The information can identify a plurality of third-party content slots of one or more information resources of the content publisher. In addition, the information can include visitor traffic-related information that may be useful to the third-party content provider when deciding whether to reserve one or more third-party content slots on one or more information resources of the content publisher. This visitor traffic-related information can include information about the number of visitors visiting one or more information resources of the content publisher, the types of visitors, the various types of content slots on the one or more information resources available to be reserved, the cost to reserve one or more of the content slots, amongst others. In some implementations, the reservation interface module 332 can receive the traffic-related information from the activity log data maintained by the data processing system 110 for the information resource of the content publisher. As described above, a script provided by the solicitation module 330 and included within the information resources of the content publisher may enable the data processing system 110 to receive activity data associated with visitor activity at the information resource and maintain logs of the activity data. In some implementations, the reservation interface module 332 can be configured to determine traffic-related information or statistics from the traffic related information and provide the information for display on the reservation interface.

In addition to the visitor traffic-related information, the reservation interface can include a visual representation of the information resource. The visual representation of the information resource can include one or more visual indicators identifying the content slots on the information resource. In this way, the third-party content provider can be made aware of where a creative will appear when served on the information resource. In some implementations, the interface can be configured such that when an object on the interface is hovered over, a visual indicator located on, near or around the content slot on the visual representation of the information resource corresponding to the object is actuated.

In some implementations, the reservation interface module 332 can also be configured to determine the cost for reserving each of the content slots associated with the content publisher that are available for reservation. In some implementations, the reservation interface module 332 can receive the cost for reserving a content slot from the content publisher. In some implementations, the reservation interface module 332 can determine the cost for reserving a content slot based on the traffic-related information associated with the information resources and the content slots themselves, including the size of the content slot, the daily number of impressions and a number of conversions, amongst others. In some implementations, the cost can be based on supply and demand. For instance, based on a number of available dates, the reservation interface module 332 can determine a level of demand for the content slot and set a cost accordingly. In some implementations, the reservation interface module 332 can look at historical reservations to determine how much content providers are willing to pay. In some implementations, the reservation interface module 332 can identify the cost of other content publishers having similar traffic related statistics or include content related to similar topics to determine a cost for the content slots. In some implementations, the reservation interface module 332 may be configured to determine a cost based on the available inventory of content slots of similar sites.

The reservation interface module 332 can be configured to determine separate costs for reserving each of the content slots. The cost of a content slot can be dictated in part by location of the content slot, the size of the content slot, the type of creative being inserted (for instance, creatives including video, creatives including audio, creative with content extensions) in addition to the content publisher associated with the information resource on which the content slot is inserted.

In some implementations, the reservation interface module 332 can also be configured to determine the cost to reserve a content slot based on an availability of the content slot. For instance, a content slot that is available for one day can be priced differently than a content slot that is available for a longer period of time. Moreover, the cost to reserve a content slot can vary based on the day of the week, the time of the year, the season, amongst others. Generally, the reservation interface module 332 can determine the cost to reserve a content slot based on an anticipated number of views to be received during a particular reservation period.

The reservation interface module 332 can be configured to receive, from a third-party content provider, a request to reserve a particular content slot identified on the reservation interface. Stated in another way, the request to reserve a particular content slot can be a request to insert one or more creatives within a particular third-party content slot of the plurality of third-party content slots when serving an information resource on which the content slot according to a reservation policy. The request can identify the one or more creatives to insert within the content slot being reserved. The reservation policy can identify one or more rules according to which the one or more creatives are to be provided for display within the third-party content slot of the information resource when the information resource is served. For instance, the reservation policy can include a reservation schedule that identifies a time period over which to reserve the particular content slot. In some implementations, the third-party content provider can select the time period via a calendar object. In some implementations, the granularity of the reservation schedule can range from a minute, an hour, a day, a week, or even longer. In addition, the third-party content provider can include one or more creatives in the request to reserve a particular content slot. In some implementations, the reservation interface module 332 can be configured to allow the third-party content provider to identify a percentage of impressions that each of the creatives should receive. In some implementations, the reservation interface module 332 can be configured to allow the third-party content provider to indicate in the request that a first creative is to receive 50% of the impressions, the second creative is to receive 30% of the impressions and the third creative is to receive 20% of the impressions. The reservation interface module 332 can receive such requests, identify one or more content serving restrictions and create one or more rules which form the reservation policy according to which the creatives are inserted in the content slot.

The reservation interface module 332, in response to receiving the request to reserve a particular content slot, can provide a payment form to the third-party content publisher. In some implementations, the third-party content publisher can have an account with the data processing system 110 and therefore, payments may be automatically processed once a request to reserve a particular content slot is received. The reservation interface module 332 can receive payment details from the third-party content provider and process the request to insert the creative within the particular third-party content slot according to the reservation policy associated with the request.

The reservation interface module 332 can be configured to store data associated with the request to insert the creative within the particular third-party content slot. The stored data can be useful to provide, for display, the creative within the particular third-party content slot of the information resource according to the reservation policy. In some implementations, the reservation interface module 332 can store the data in a database, such as the database 140.

Figure 5A:
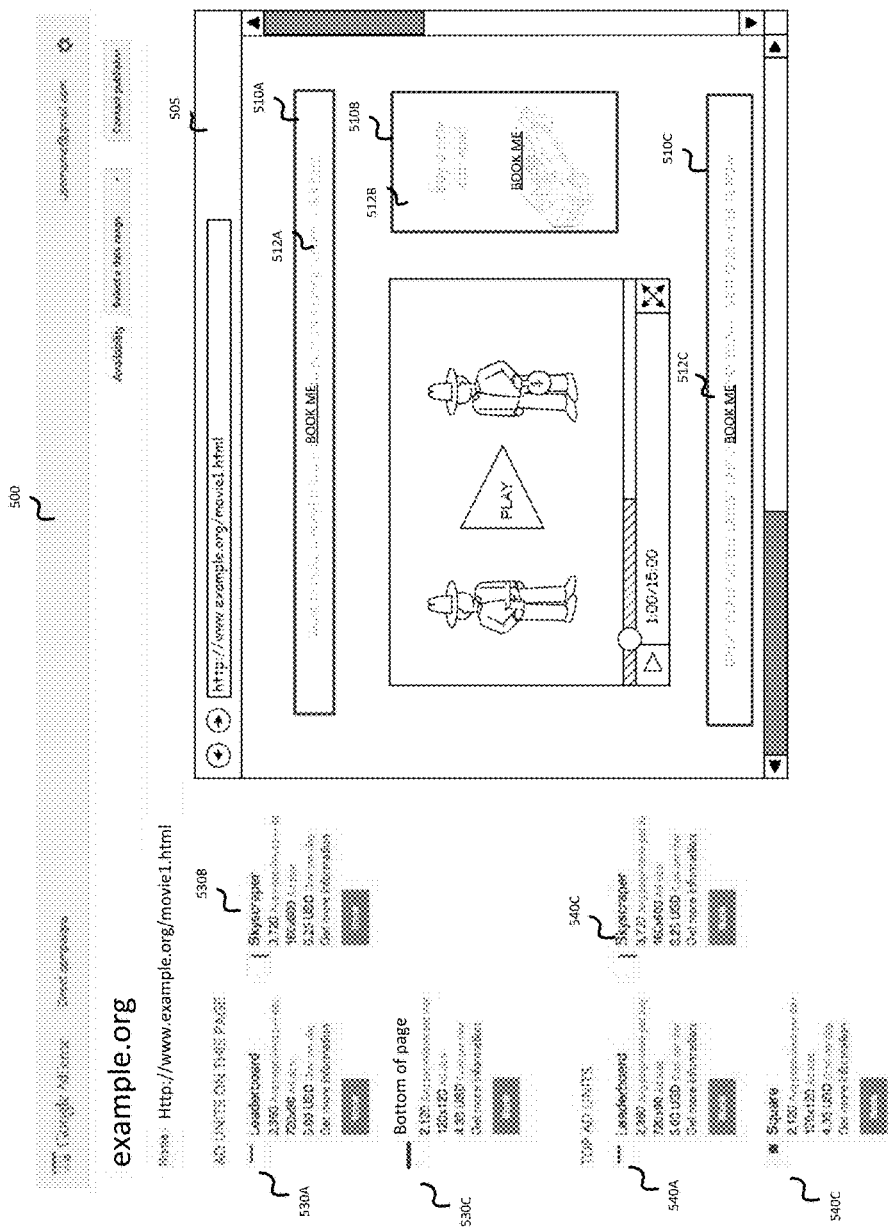
FIG. 5A is a screenshot of an interface for reserving a content slot of the information resource shown in FIG. 3, according to an illustrative implementation.

Referring briefly to FIG. 5A, FIG. 5A is a screenshot of an interface for reserving a content slot of the information resource shown in FIG. 4. The screenshot depicts a reservation interface 500 that can be rendered for display by the content provider computing device 115 during creation of a direct content item placement campaign. The reservation interface 500 can be a part of an information resource and can be configured to enable the reservation of content slots on information resources of a content publisher, such as the content publisher example.org. In some implementations, the reservation interface can be provided for display responsive to an action being taken on a solicitation object, such as the solicitation object 416 shown in FIG. 4.

The reservation interface 500 can include a list of content slot objects 530A-530C providing information corresponding to content slots available to be reserved on the information resource on which the solicitation object on which an action was taken was displayed, a list of the top performing content slots that are a part of any information resource of the content publisher, and a preview of the information resource on which the solicitation object on which an action was taken. The preview 505 is a preview of the user interface 400 shown in FIG. 4 but is modified to include actionable objects 512A-512C inserted as overlays within the content slots 510A-510C. The content slot 510C, which previously contained a solicitation creative 412C shown in FIG. 4 can also be reserved via the actionable object 512C.

The list of content slot objects 530A-530C correspond to the content slots 510A-510C shown in the preview 505. Each of the content slot objects 530A-530C can include an average number of page views per day, a content slot size, a daily cost for reserving the content slot, as well as an actionable object through which the content slot can be reserved. The list of content slot objects 540A-540C correspond to the top performing content slots of information resources of the content publisher.

Figure 5B:
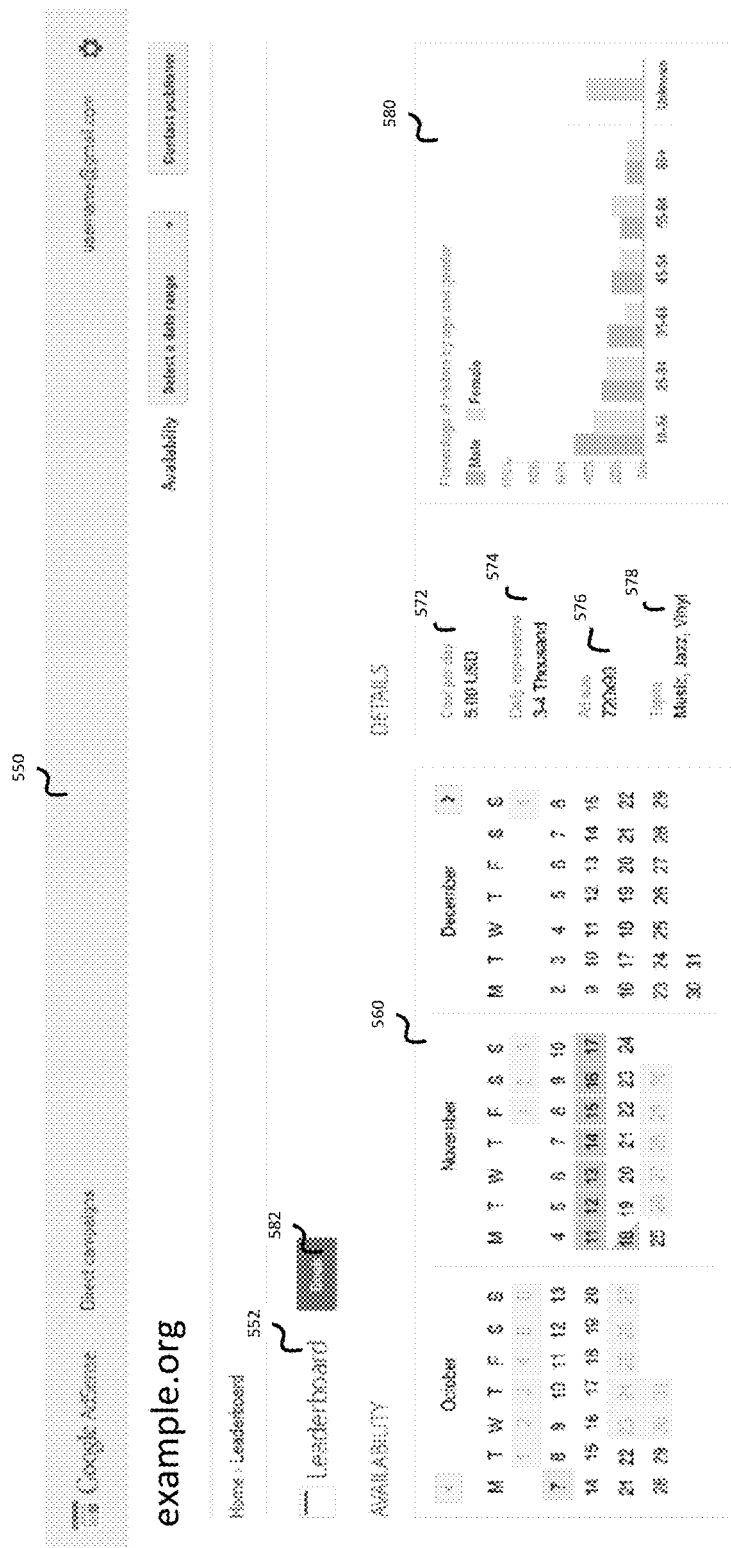
FIG. 5B is a screenshot of an interface for reserving a content slot of the information resource shown in FIG. 3, according to an illustrative implementation.

Referring now also to FIG. 5B, FIG. 5B is a screenshot of the reservation interface for reserving a content slot of the information resource shown in FIG. 4. The screenshot of the reservation interface 550 can be provided for display responsive to a request, from the content publisher, to reserve a content slot. In some implementations, the reservation interface 550 can be provided for display upon a third-party content provider taking an action on an actionable object, such as the actionable objects 512A-512C or the actionable objects included in the content slot objects 530A-530C and 540A-540C. As shown in FIG. 5B, the reservation interface 550 provides a visual indication 552 indicating that the content slot being reserved is the "leaderboard" content slot, which corresponds to the content slot 510A.

The reservation interface 550 includes a calendar object 560 that is configured to indicate the dates the content slot is available to be reserved as well as the dates on which the content slot is unavailable to be reserved. In addition, the reservation interface indicates a cost 572 for reserving the content slot, a range of daily impressions 574, a content slot size 576 and one or more topics 578 with which the information resource of which the content slot is a part. In addition, the reservation interface 550 includes a chart 580 indicating a percentage of visitors arranged by information associated with visitors. A third-party content provider can select one or more dates over which to reserve the content slot by selecting dates within the calendar object 560. Once the dates are selected, the third-party content provider can select an actionable object 582, which causes the reservation interface to proceed with reserving the content slot based on the selected dates. In some implementations, a payment interface or a confirmation of the reservation is provided for display responsive to the actionable object 582 being selected by the third-party content provider.

Referring again to FIG. 3, the creative placement module 334 of the data processing system 110 can be part of, or can include scripts executed by, one or more servers in the data processing system 110. In some implementations, the creative placement module 334 can be configured to provide, for display, the creative within the particular third-party content slot of the information resource according to the reservation policy. In some implementations, the creative placement module 334 can be configured to receive a request to serve a creative for a content slot of an information resource. The request to serve an information resource can be generated in response to an end-user computing device requesting to view the information resource. In some implementations, the indication received by the creative placement module 334 can identify the content slot for which to serve a creative. In some implementations, the creative placement module 334 can perform a lookup in the database for the content slot and identify a reservation associated with the content slot for the time at which the request to serve a creative for a content slot of an information resource is received by the creative placement module 334. The creative placement module 334 can be configured to identify a reservation policy associated with the identified reservation. The creative placement module 334 can then provide a creative to insert in the content slot when the information resource is served. The creative that is provided for insertion can be a creative provided by the third-party content provider that requested the reservation of the content slot.

FIG. 6 is a flow diagram depicting an method of reserving a particular third-party content slot of an information resource of a content publisher, according to an illustrative implementation. The method 600, via a processor of a data processing system, such as the data processing system 300 shown in FIG. 3, can receive a request to receive information for inserting a creative within one or more third-party content slots available on the information resource (Block 605). The method can provide, for display, an interface that includes the information regarding inserting the creative within one or more third-party content slots on the information resource of the content publisher (Block 610). The method can then receive, via the interface, a request to insert a creative within a particular third-party content slot of the plurality of third-party content slots according to a reservation policy (Block 615). The method can store data associated with the request to insert the creative within the particular third-party content slot (Block 620).

In further detail, the method can receive a request to receive information for inserting a creative within one or more third-party content slots available on an information resource of a content publisher (Block 605). In some implementations, the method can receive the request in response to an action taken on an object included within an information resource of a content publisher. In some implementations, the action can be taken on a solicitation object located on an information resource of a content publisher. In some implementations, the action can be taken by a potential third-party content provider that may have an interest in inserting creatives in content slots when the information resource is served to end user computing devices. The request can identify the information resource associated with the content slots within which to insert creatives. In some implementations, the request can also identify the content provider seeking the information for inserting a creative.

In some implementations, the method can identify a content publisher that has indicated an interest in utilizing a content placement system to provide creatives for insertion in one or more content slots of the information resources of the content publisher. In some implementations, the method can identify a content publisher in response to receiving a request from the content publisher to utilize one or more content slots for serving creatives of content providers participating in direct content placement campaigns. In some implementations, the method can identify a content publisher based on an analysis of traffic related information associated with the content publisher. For instance, content publishers that satisfy a minimum traffic metric threshold may be identified as candidate content publishers that may be eligible or willing to participate in providing content slots for serving creatives of content providers participating in direct content placement campaigns. In some implementations, the method can allow content publishers participating in a content placement service to opt-in to participate in providing content slots for serving creatives of content providers participating in direct content placement campaigns. In some implementations, the method can receive, from a content publisher, a request to manage third-party content slot reservations. In some implementations, the method can then provide, to the content publisher, an object for insertion into a source code of the information resource of the content publisher.

The method can provide, on an information resource of a content publisher, a solicitation object through which a potential third-party content provider accessing the information resource, can actuate the solicitation object to participate in a direct content placement campaign that involves serving creatives on the information resource on which the solicitation object was provided. The solicitation object can be an actionable object, such as a link, an icon, a button, or any other object that a potential content provider can actuate. In some implementations, the solicitation object can be provided within a solicitation creative that is served within a content slot of the information resource. In some implementations, the solicitation creative can be generated using traffic metrics associated with the information resource. In some implementations, the solicitation object can be provided for display within an area of the information resource where primary content is displayed.

The method can provide the solicitation object on an information resource of a content publisher that has opted in to participate in providing content slots for serving creatives of content providers participating in direct content placement campaigns. In some implementations, for the information resource to be able to display the solicitation object, the method can be configured to embed or insert a script in the information resource of the content publisher. In some implementations, the method can provide the script to the content publisher, who can insert the script in the information resource. In some implementations, the script can be configured to enable the retrieval of information related to the one or more information resources of the content publisher. For instance, the script can be configured to allow for receiving traffic related statistics of the content publisher.

In some implementations, the method can maintain log data relating to each visit to the information resources of the content publisher. In this way, the method can create a data log based on visits to the information resources by end user computing devices and determine traffic metrics, such as an average daily number of visits, an average number of daily unique visitors, types of visitors visiting the site, amongst others. In some implementations, the method can receive or determine, from log data, statistics pertaining to the information resource. The statistics can include one or more of an average number of daily impressions, one of a size of the third-party content slot and a size of a creative that can be inserted within the third-party content slot, and one or more topics with which the information resource is associated.

The method can provide, for display, a reservation interface that includes the information regarding inserting the creative within one or more third-party content slots on the information resource of the content publisher (Block 610). In some implementations, the information can identify a plurality of third-party content slots associated with the content publisher and costs associated with reserving the content slots for inserting the creative within each of the plurality of third-party content slots. In some implementations, the reservation interface can include information pertaining to third-party content slots included within the information resource of the content publisher as well as information pertaining to third-party content slots included within any information resource associated with the information resource of the content publisher. In some implementations, the reservation interface can include a preview of the information resource of the content publisher. In some implementations, the preview of the information resource can insert actionable objects within the third-party content slots in which creatives can be inserted. In some implementations, each of the actionable objects within the third-party content slots can be linked with a reservation page through which the third-party content slot within which the actionable object is inserted can be reserved.

In some implementations, the method can determine a cost associated with inserting the creative within the third-party content slot according to the reservation policy. The method can then provide, for display, the determined cost associated with inserting the creative within the third-party content slot according to the reservation policy. In some implementations, the determined cost can be provided for display as a cost to reserve the content slot for a predetermined time period, for instance, an hour, a day, a week, amongst others. In some implementations, the method can provide a plurality of costs for display corresponding to various lengths of time.

The method can then receive, via the interface, a request to insert one or more creatives within a particular third-party content slot of the plurality of third-party content slots according to a reservation policy (Block 615). In some implementations, the request can identify the one or more creatives to insert in the particular third-party content slot. In some implementations, the reservation policy can identify one or more rules according to which the creatives are to be provided for display within the third-party content slot of the information resource when the information resource is served.

In some implementations, the method can, via the execution of the script, create reservation schedules for each of the content slots identify as content slots to be managed by the solicitation module. The reservation schedule of a content slot is a schedule indicating the availability of the content slot. When a content slot is reserved for a given period of time, the reservation schedule is updated to indicate that the content slot is reserved for the given period of time. In this way, third-party content providers interested in reserving the content slot are only able to reserve time slots during which the reservation schedule of the content slot indicates that the content slot is available.

In some implementations, the method can analyze the information resources of the content publisher and identify all content slots configured to serve third-party content items. The method can tag, label, or otherwise modify the identified content slots such that the solicitation module can be configured to manage the reservation of the content slots, while also being able to manage the content capable of being inserted in the identified content slots. In some implementations, the method can modify the content slots such that only the data processing system can provide content for insertion in the content slots when rendered on an end user computing device, such as the end user computing device.

The method can store data associated with the request to insert the creative within the particular third-party content slot (Block 620). The stored data can be used to provide, for display, the creative within the particular third-party content slot of the information resource according to the reservation policy.

In some implementations, the method can provide, for display, the creative within the particular third-party content slot of the information resource according to the reservation policy. In some implementations, the method can receive a request to serve a creative for a content slot of an information resource. The request to serve an information resource can be generated in response to an end-user computing device requesting to view the information resource. In some implementations, the indication received by the method can identify the content slot for which to serve a creative. In some implementations, the method can perform a lookup in the database for the content slot and identify a reservation associated with the content slot for the time at which the request to serve a creative for a content slot of an information resource is received by the method. The method can identify a reservation policy associated with the identified reservation. The method can then provide a creative to insert in the content slot when the information resource is served. The creative that is provided for insertion can be a creative provided by the third-party content provider that requested the reservation of the content slot.

Figure 7:
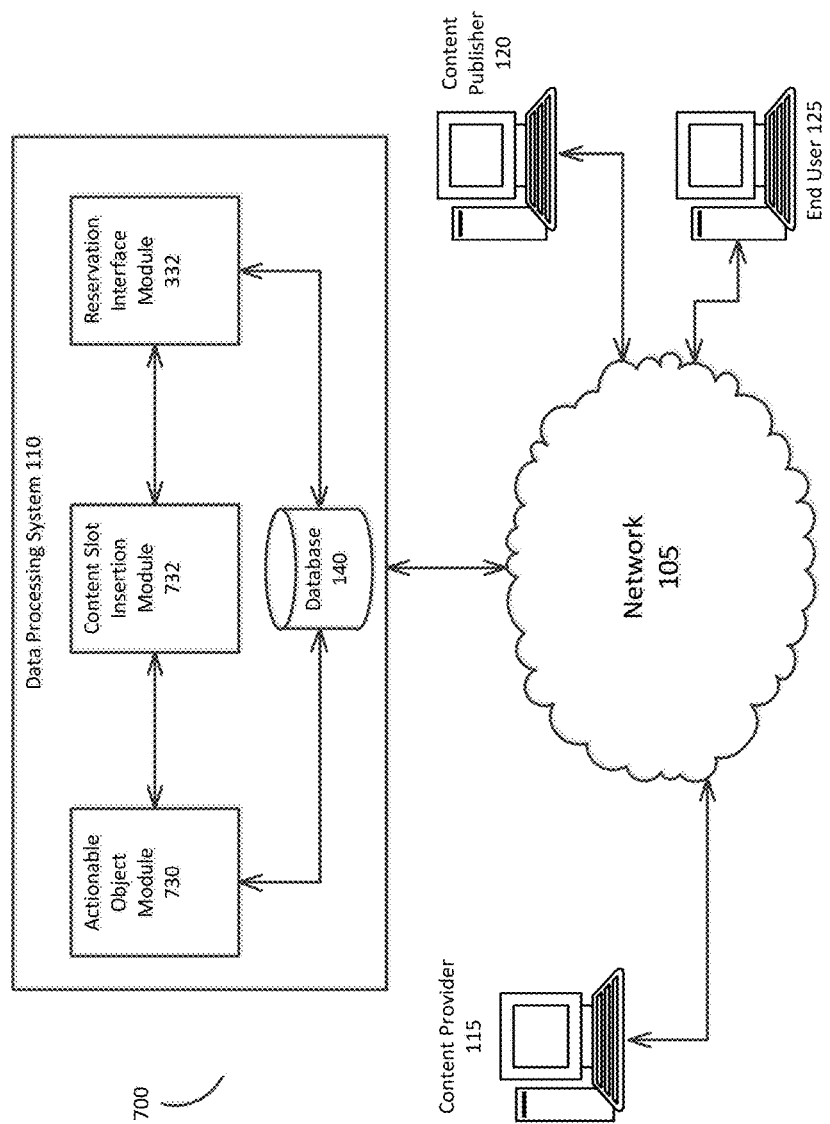
FIG. 7 is a block diagram depicting one environment to provide an actionable object within a third-party content slot of an information resource of a content publisher, according to an illustrative implementation.

C. Providing Actionable Reservation Objects within a Content Slot of an Information Resource of a Content Publisher FIG. 7 illustrates an system 700 for providing an actionable reservation object within a third-party content slot of an information resource of a publisher via at least one computer network, such as the network 105. The system 700 can include one or more components of the system 100 shown in FIG. 1 and the system 300 shown in FIG. 3. The system 700 includes the data processing system 110 shown in FIG. 1, but includes additional modules configured to provide an actionable object within a third-party content slot of an information resource of a publisher.

The data processing system 110 can include an actionable object module 730, a content slot insertion module 732 and the reservation interface module 332 (described above with respect to FIG. 3 and Section B in general). The data processing system 110 can be configured to receive an indication of interest in providing, for display, a creative within at least one third-party content slot of an information resource of a content publisher. The information resource includes one or more third-party content slots available to be reserved to serve creatives. The data processor can identify at least one third-party content slot included in the information resource available to be reserved to serve one or more creatives. The data processor can insert an actionable object within the identified third-party content slot. The actionable object can be configured to generate a request to provide an interface for reserving the identified third-party content slot to display the creative responsive to an action being taken on the actionable object. The data processor can then render the information resource including the inserted actionable object within the identified third-party content slot.

The actionable object module 730 can be part of, or can include scripts executed by, one or more servers in the data processing system 110. In some implementations, the actionable object module 730 can be configured to identify one or more content publishers that may be interested in participating in direct content placement campaigns. As described above, in a direct content placement campaign, a content provider can reserve a content slot of an information resource of a content publisher such that each time the information resource is served, a creative of the content provider is provided for display within the content slot of the information resource. In some implementations, the actionable object module 730 can identify such content providers by crawling the Internet to identify websites that meet threshold traffic-related metrics. The traffic-related metrics can be average daily visitors, average daily impressions, average daily revenue through content placement, amongst others. In some implementations, the traffic-related metrics of content publishers and of particular information resources (for instance, web pages) of content publishers can be determined from existing applications that monitor and publish traffic at various content publishers.

In some implementations, the actionable object module 730 can be configured to identify one or more content publishers that may be interested in participating in direct content placement campaigns by identifying content publishers that are currently serving creatives on their information resources. In some implementations, the content publishers may serve creatives via an advertising auction system or via some other direct content placement campaign. In some implementations, the actionable object module 730 can be configured to identify content publishers that have information resources that are currently receiving creatives from the data processing system 110, for instance, via an advertising auction system.

The actionable object module 730 can be configured to provide content publishers that may be interested in participating in direct content placement campaigns information for participating in direct content placement campaigns. In some implementations, the actionable object module 730 can do so by direct marketing to content publishers, for instance, via email, banner ads, or other forms of marketing.

The actionable object module 730 can be configured to receive an indication of interest in providing, for display, a creative within at least one third-party content slot of an information resource of a content publisher. In some implementations, the actionable object module 730 may receive the request to receive an indication of interest from a content publisher. In some implementations, the actionable object module 730 may receive the request to receive an indication of interest from a content publisher the via an interface through which a content provider can communicate with the data processing system 110. In some implementations, the content provider can have an existing relationship with the data processing system 110. In some implementations, the content provider can include information resources that have content slots configured to receive creatives from one or more modules of the data processing system 110. In some implementations, the content slots can be configured to receive creatives that are selected by an advertising auction system. In some implementations, the content publisher, may, via the interface, provide an indication of interest by selecting a user input object provided on the interface. In some implementations, the content publisher may provide the indication of interest responsive to a marketing effort of the actionable object module 730 or the data processing system 110 in general.

Figure 8A:
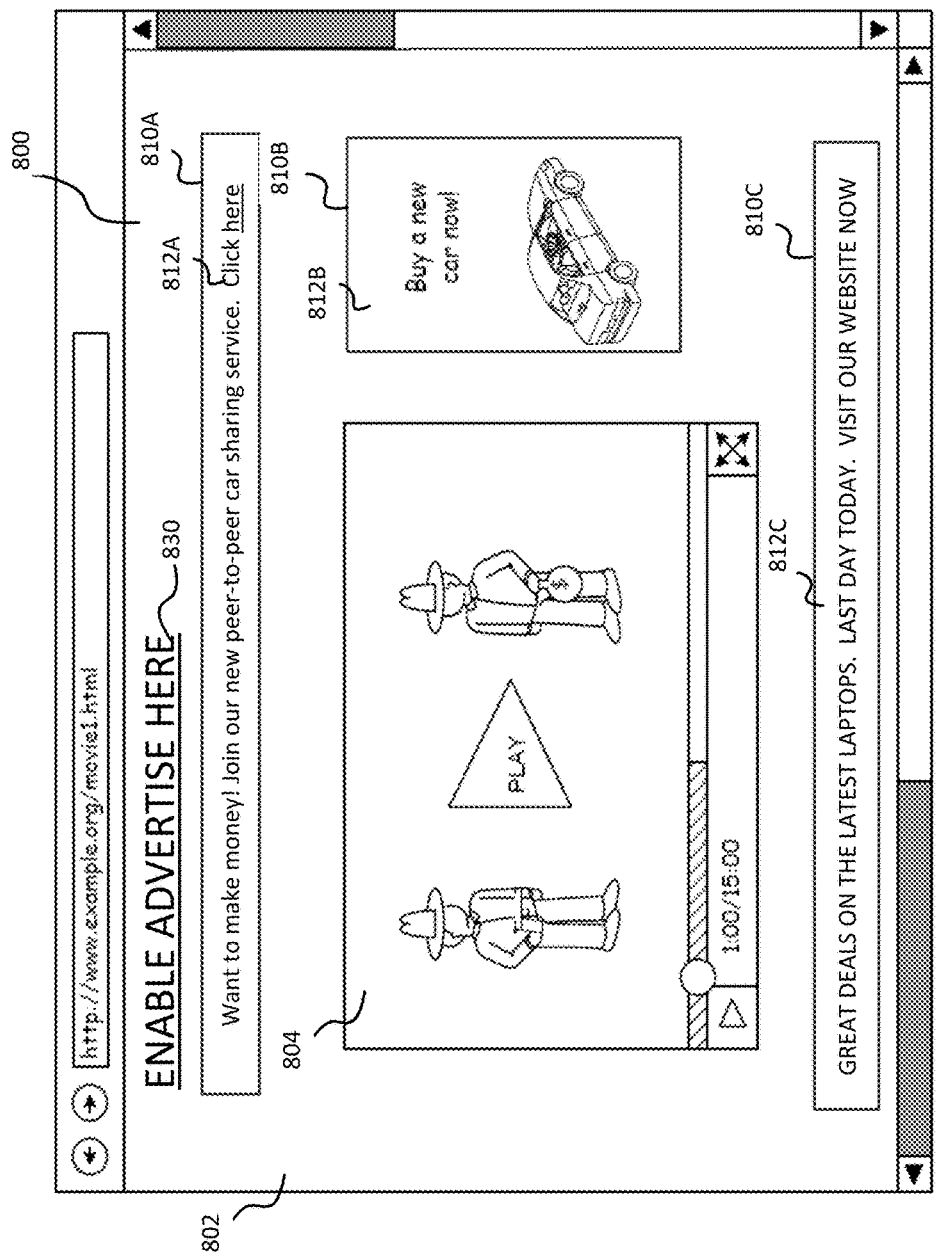
FIG. 8A is a display depicting an information resource with an actionable object to identify content slots of the information resource that are available to be reserved, according to an illustrative implementation.

The actionable object module 730 can be configured to configure one or more information resources of a content publisher to include an actionable view-changing object. In some implementations, the actionable object module 730 can provide, to a content publisher, a software construct, such as a script, code, or other software instructions, that when inserted in an information resource of the content publisher, can cause an actionable view-changing object to appear on the information resource when the information resource is served. In some implementations, the actionable object module 730 can automatically configure one or more information resources of a content publisher to include an actionable object by providing a creative that includes the actionable view-changing object for insertion into a content slot of the information resources. In some implementations, the content slot in which the creative that includes the actionable view-changing object is inserted can be configured to receive creatives provided by the actionable object module 730 or the data processing system 110. In some implementations in which the actionable view-changing object is provided for display on an area of the information resource that is outside a content slot, source code of the information resource may be modified to include the software construct. In some implementations, the actionable object module 730 may modify the source code of the information resource or the content publisher may modify the source code. In some implementations, the view-changing actionable object can be configured to cause the data processing system 110 to render the information resource such that actionable reservation objects are inserted within the identified third-party content slot. Additional details regarding reservation objects are provided below. FIG. 8A shows a screenshot of an information resource with an actionable view-changing object to identify content slots of the information resource that are available to be reserved.

The content slot insertion module 732 can be part of, or can include scripts executed by, one or more servers in the data processing system 110. The content slot insertion module 732 can be configured to identify, on an information resource, at least one third-party content slot available to be reserved to serve one or more creatives. In some implementations, the content slot insertion module 732 can be configured to first identify all of the content slots on the information resource. The content slot insertion module 732 can then identify, from all of the identified content slots, one or more content slots that are available to be reserved to serve one or more creatives. In some implementations, the content slot insertion module 732 can identify content slots available to be reserved by identifying content slots that are tagged or otherwise marked as being available to be reserved. In some implementations, an information resource can include a first third-party content slot configured to be available to be reserved to serve one or more creatives via a direct content placement campaign and a second third-party content slot configured to display creatives selected for insertion via an content placement auction. In some implementations, the content publisher can identify the content slots that the content publisher would like to participate in a direct content placement campaign. In some implementations, the content publisher can tag the content slot via a source code of the information resource. In some implementations, the content slot insertion module 732 can configure one or more of the content slots of the information resource to be reserved. This can be possible by configuring the content slot to only receive creatives from the data processing system 110.

The content slot insertion module 732 can be configured to insert at least one actionable reservation object within one or more third-party content slots available to be reserved to serve one or more creatives. The actionable reservation object can be configured to provide information for reserving the identified third-party content slot to display the creative responsive to an action being taken on the actionable reservation object. In some implementations, the actionable reservation object can be configured to cause the data processing system 110 to provide a reservation interface through which a content provider can reserve the content slot in which the reservation object was inserted in response to an action being taken on the actionable reservation object. The actionable reservation object can include one or more of a link, a creative, a button, an icon, or any other actionable object on which an action can be taken via an input device or mechanism.

In some implementations, the content slot insertion module 732 can be configured to insert an content slot occupying object within the content slot in which the actionable reservation object is inserted or placed. The content slot occupying object can be configured to occupy the content slot. In some implementations, the content slot occupying object can be translucent such that the content slot occupying object partially obscures an underlying creative previously inserted in the content slot. In some implementations, the content slot occupying object can be opaque such that it completely obscures an underlying creative. In some implementations, the content slot occupying object can partially occupy the content object. In some implementations, the content slot occupying object can match the dimensions of the content slot. In some implementations, the content slot occupying object be of a particular color that stands out against a background color of the information resource. In this way, the content slot occupying object can help a content provider view the area where a creative of the content provider will appear if the content provider reserves the content slot. In some implementations, the content slot insertion module 732 can select a shape, size, color, translucency, opacity, or other characteristics of the content slot occupying object.

Figure 8B:
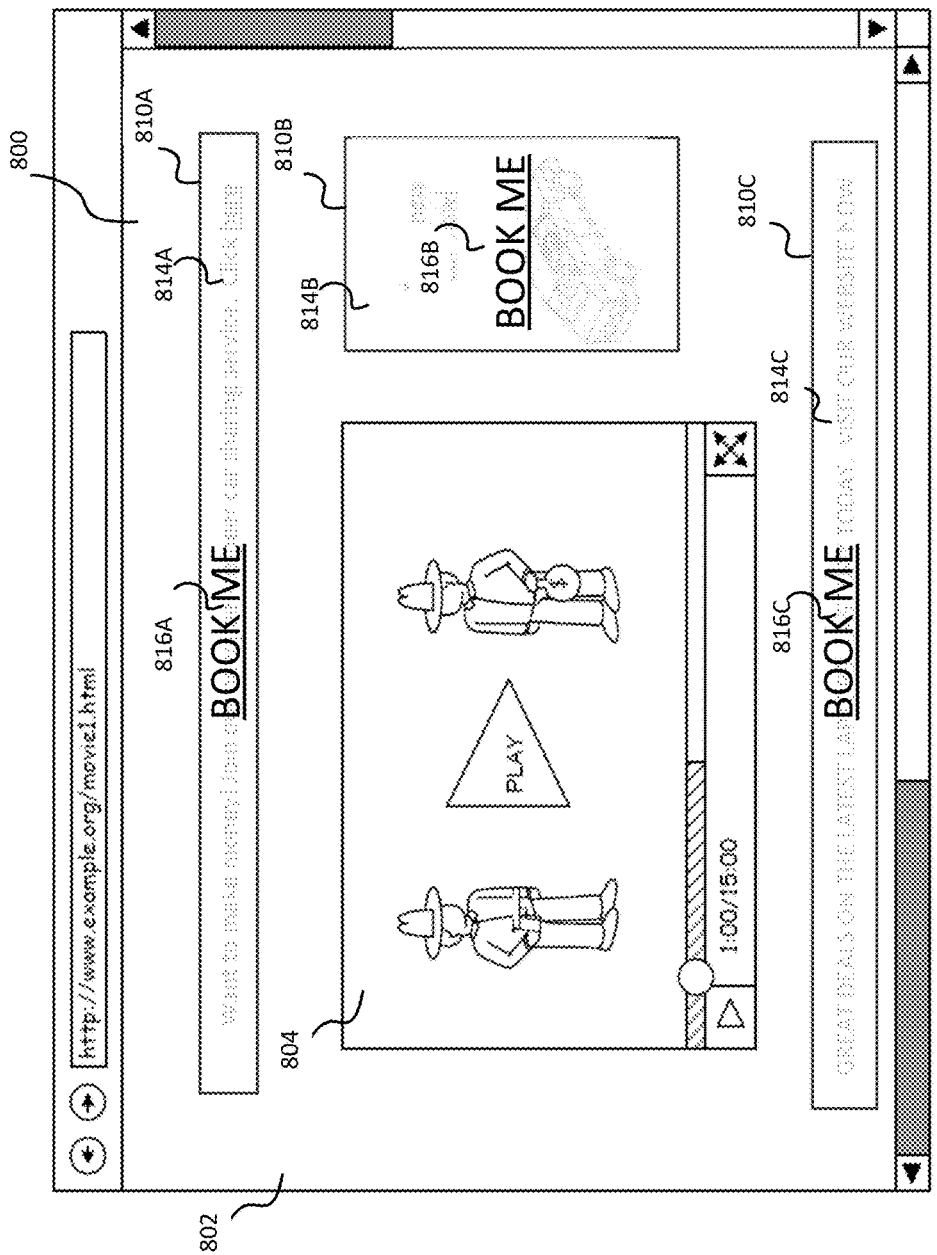
FIG. 8B is a display depicting an information resource having actionable objects positioned within content slots of the information resource for reserving the content slots of the information resource shown in FIG. 8A, according to an illustrative implementation.

The content slot insertion module 732 can be configured to render the information resource including the inserted actionable reservation object within the identified third-party content slot. In some implementations, the content slot insertion module 732 can be configured to render the information resource including the inserted actionable reservation object within the identified third-party content slot in response to an action being taken on the view-changing object. FIG. 8B illustrates a screenshot of an information resource including actionable reservation objects object within the identified third-party content slot.

Referring now to FIG. 8A, a display depicting an information resource with an actionable view-changing object to identify content slots of the information resource that are available to be reserved is shown. The display shows an information resource 800 that includes a primary content area 802 in which primary content 804 is displayed. The information resource also includes a plurality of content slots 810A-810C (generally content slot 810). The plurality of content slots can be configured to hold creatives 812A-812C (generally creative 812) that are inserted within the content slots 810 when the information resource 800 is served. The content slots 810A-810C have designated locations on the information resource and have a predetermined content slot size. The location and size of the content slots can factor into the cost for reserving one of these slots. As such, for a content provider interested in reserving one of the content slots, the content provider may be interested in visually identifying the content slot the content provider is interested in reserving.

The information resource 800 further includes an actionable view-changing object 830. The actionable view-changing object 830 can be configured to generate a request to provide an interface for reserving one or more identified third-party content slots in which to insert the creative responsive to an action being taken on the actionable object. The actionable view-changing object can be a link, an icon, a banner, a creative, or any other content item upon which an action can be taken. As shown in FIG. 8A, the actionable view-changing object is a link that contains the text "enable advertise here." Instances of actions can include a click, a hover over, a tap, or some other way of actuating the actionable object. By taking an action on the actionable view-changing object 830, the actionable object module 730 or the data processing system 110 can render a second information resource.

FIG. 8B is a display depicting the same information resource 800 having actionable reservation objects 816A-816C (generally actionable reservation object 816) positioned within the content slots 810A-810C of the information resource 800. The actionable reservation objects can be configured to reserve the content slots 810 of the information resource 800. The information resource 800 further includes content slot occupying objects 814A-814C positioned over the creatives 812 shown in FIG. 8A. In some implementations, the content slot occupying objects 814 can be opaque, translucent or transparent. In some implementations, the content slot occupying objects 814 can be configured to cover any creatives inserted in the content slot. In some implementations, the content slot occupying objects 814 can be inserted in the content slots 810 to attract the attention of a content provider. In some implementations, the content slot occupying objects 814 can be inserted to demonstrate, to a content provider, an area of the information resource where a creative will appear if the corresponding content slot is reserved.

The actionable reservation objects 816 can be inserted within the content slots 810 responsive to an action taken on the actionable view-changing object 830 shown in FIG. 8A. The actionable reservation objects 816 can be a link, an icon, a banner, a creative, or any other content item on which an action can be taken. In some implementations, the reservation objects 816 can be configured to provide, for display, a reservation interface, such as the reservation interface shown in FIG. 5B, through which a content provider can reserve a content slot corresponding to the reservation object on which the action was taken. As such, each of the reservation objects corresponds to a reservation interface for reserving the content slot that holds or contains the reservation object on which the action was taken. For instance, if a content provider clicked on the reservation object 816A, the data processing system 110 can be configured to provide a reservation interface for reserving the content slot 810A. Conversely, if the content provider clicked on the reservation object 816B, the data processing system 110 can be configured to provide a reservation interface for reserving the content slot 810B. In this way, by providing the reservation object within the actual content slot the content provider intends to reserve, errors relating to reserving a content slot that the content provider did not intend to reserve can be reduced, if not eliminated.

Responsive to an action taken on one of the reservation objects 816A-816C, the data processing system 110 can provide a reservation interface for reserving the content slot associated with the reservation object on which the action was taken. An screenshot of the reservation interface is shown in FIG. 5B.

The reservation interface module 332 can be part of, or can include scripts executed by, one or more servers in the data processing system 110. A discussion of the reservation interface module 332 and its functionality have previously been described above in Section B. In some implementations, the reservation interface module 332 can be configured to provide, for display, a reservation interface through which a third-party content provider can reserve one or more content slots of information resources of a content publisher. The reservation interface module 332 can be configured to provide the reservation interface for display responsive to receiving a request to receive information for inserting a creative within one or more third-party content slots available on the information resource. In some implementations, the reservation interface module 332 can be configured to provide the reservation interface to a third-party content provider in response to the third-party content provider taking an action on an reservation object, such as the reservation object 816, provided for display on an information resource of the content publisher. For instance, the reservation interface module 332 may provide the reservation interface 550 shown in FIG. 5B to a third-party content provider in response to the third-party content provider clicking on the reservation object 816 provided for display on the information resource 800 shown in FIG. 8B.

In some implementations, the reservation interface can be provided on or as an information resource of the data processing system 110. The reservation interface can be configured to allow a third-party content provider to reserve one or more content slots of one or more information resources of a content publisher. The reservation interface can be configured to provide information that a third-party content provider can benefit from when determining whether to reserve one or more content slots of an information resource.

The information can identify a plurality of third-party content slots of one or more information resources of the content publisher. In addition, the information can include visitor traffic-related information that may be useful to the third-party content provider when deciding whether to reserve one or more third-party content slots on one or more information resources of the content publisher. This visitor traffic-related information can include information about the number of visitors visiting one or more information resources of the content publisher, the types of visitors, the various types of content slots on the one or more information resources available to be reserved, the cost to reserve one or more of the content slots, amongst others. In some implementations, the reservation interface module 332 can receive the traffic-related information from the activity log data maintained by the data processing system 110 for the information resource of the content publisher. As described above, a script provided by the solicitation module 330 and included within the information resources of the content publisher may enable the data processing system 110 to receive activity data associated with visitor activity at the information resource and maintain logs of the activity data.

In some implementations, the reservation interface module 332 can be configured to determine traffic-related information or statistics from the traffic related information and provide the information for display on the reservation interface.

In addition to the visitor traffic-related information, the reservation interface can include a visual representation of the information resource. The visual representation of the information resource can include one or more visual indicators identifying the content slots on the information resource. In this way, the third-party content provider can be made aware of where a creative will appear when served on the information resource. In some implementations, the interface can be configured such that when an object on the interface is hovered over, a visual indicator located on, near or around the content slot on the visual representation of the information resource corresponding to the object is actuated.

In some implementations, the reservation interface module 332 can also be configured to determine the cost for reserving each of the content slots associated with the content publisher that are available for reservation. In some implementations, the reservation interface module 332 can receive the cost for reserving a content slot from the content publisher. In some implementations, the reservation interface module 332 can determine the cost for reserving a content slot based on the traffic-related information associated with the information resources and the content slots themselves, including the size of the content slot, the daily number of impressions and a number of conversions, amongst others. In some implementations, the cost can be based on supply and demand. For instance, based on a number of available dates, the reservation interface module 332 can determine a level of demand for the content slot and set a cost accordingly. In some implementations, the reservation interface module 332 can look at historical reservations to determine how much content providers are willing to pay. In some implementations, the reservation interface module 332 can identify the cost of other content publishers having similar traffic related statistics or include content related to similar topics to determine a cost for the content slots. In some implementations, the reservation interface module 332 may be configured to determine a cost based on the available inventory of content slots of similar sites.

The reservation interface module 332 can be configured to determine separate costs for reserving each of the content slots. The cost of a content slot can be dictated in part by location of the content slot, the size of the content slot, the type of creative being inserted (for instance, creatives including video, creatives including audio, creative with content extensions) in addition to the content publisher associated with the information resource on which the content slot is inserted.

In some implementations, the reservation interface module 332 can also be configured to determine the cost to reserve a content slot based on an availability of the content slot. For instance, a content slot that is available for one day can be priced differently than a content slot that is available for a longer period of time. Moreover, the cost to reserve a content slot can vary based on the day of the week, the time of the year, the season, amongst others. Generally, the reservation interface module 332 can determine the cost to reserve a content slot based on an anticipated number of views to be received during a particular reservation period.

The reservation interface module 332 can be configured to receive, from a third-party content provider, a request to reserve a particular content slot identified on the reservation interface. Stated in another way, the request to reserve a particular content slot can be a request to insert one or more creatives within a particular third-party content slot of the plurality of third-party content slots when serving an information resource on which the content slot according to a reservation policy. The request can identify the one or more creatives to insert within the content slot being reserved. The reservation policy can identify one or more rules according to which the one or more creatives are to be provided for display within the third-party content slot of the information resource when the information resource is served. For instance, the reservation policy can include a reservation schedule that identifies a time period over which to reserve the particular content slot. In some implementations, the third-party content provider can select the time period via a calendar object. In some implementations, the granularity of the reservation schedule can range from a minute, an hour, a day, a week, or even longer. In addition, the third-party content provider can include one or more creatives in the request to reserve a particular content slot. In some implementations, the reservation interface module 332 can be configured to allow the third-party content provider to identify a percentage of impressions that each of the creatives should receive. In some implementations, the reservation interface module 332 can be configured to allow the third-party content provider to indicate in the request that a first creative is to receive 50% of the impressions, the second creative is to receive 30% of the impressions and the third creative is to receive 20% of the impressions. The reservation interface module 332 can receive such requests, identify one or more content serving restrictions and create one or more rules which form the reservation policy according to which the creatives are inserted in the content slot.

The reservation interface module 332, in response to receiving the request to reserve a particular content slot, can provide a payment form to the third-party content publisher. In some implementations, the third-party content publisher can have an account with the data processing system 110 and therefore, payments may be automatically processed once a request to reserve a particular content slot is received. The reservation interface module 332 can receive payment details from the third-party content provider and process the request to insert the creative within the particular third-party content slot according to the reservation policy associated with the request.

The reservation interface module 332 can be configured to store data associated with the request to insert the creative within the particular third-party content slot. The stored data can be useful to provide, for display, the creative within the particular third-party content slot of the information resource according to the reservation policy. In some implementations, the reservation interface module 332 can store the data in a database, such as the database 140.

FIG. 9 is a flow diagram depicting an method of providing an actionable object within a third-party content slot of an information resource of a content publisher. In brief overview, the method can receive an indication of interest in providing, for display, a creative within at least one third-party content slot of an information resource of a content publisher (Block 905). The method can identify at least one third-party content slot included in the information resource available to be reserved to serve one or more creatives (Block 910). The method can insert an actionable object within the identified third-party content slot (Block 915). The method can then render the information resource including the inserted actionable object within the identified third-party content slot (Block 920).

In further detail, the method can receive a request to receive an indication of interest in providing, for display, a creative within at least one third-party content slot of an information resource of a content publisher (Block 905). The information resource includes one or more third-party content slots available to be reserved to serve creatives. In some implementations, the method may receive the request to receive an indication of interest from a content publisher. In some implementations, the method may receive the request to receive an indication of interest from a content publisher the via an interface through which a content provider can communicate with a data processing system. In some implementations, the content slots can be configured to receive creatives that are selected by an advertising auction system. In some implementations, the content publisher, may, via the interface, provide an indication of interest by selecting a user input object provided on the interface. In some implementations, the content publisher may provide the indication of interest responsive to a marketing effort organized or performed by the method.

The method can configure one or more information resources of a content publisher to include an actionable view-changing object. In some implementations, the method can provide, to a content publisher, a software construct, such as a script, code, or other software instructions, that when inserted in an information resource of the content publisher, can cause an actionable view-changing object to appear on the information resource when the information resource is served. In some implementations, the method can automatically configure one or more information resources of a content publisher to include an actionable object by providing a creative that includes the actionable view-changing object for insertion into a content slot of the information resources. In some implementations, the content slot in which the creative that includes the actionable view-changing object is inserted can be configured to receive creatives provided by the method. In some implementations in which the actionable view-changing object is provided for display on an area of the information resource that is outside a content slot, source code of the information resource may be modified to include the software construct. In some implementations, the method may modify the source code of the information resource or the content publisher may modify the source code. In some implementations, the view-changing actionable object can be configured to cause the method to render the information resource such that actionable reservation objects are inserted within the identified third-party content slot.

The method can identify at least one third-party content slot included in the information resource available to be reserved to serve one or more creatives (Block 910). In some implementations, the method can first identify all of the content slots on the information resource. The method can then identify, from all of the identified content slots, one or more content slots that are available to be reserved to serve one or more creatives. In some implementations, the method can identify content slots available to be reserved by identifying content slots that are tagged or otherwise marked as being available to be reserved. In some implementations, an information resource can include a first third-party content slot configured to be available to be reserved to serve one or more creatives via a direct content placement campaign and a second third-party content slot configured to display creatives selected for insertion via an content placement auction. In some implementations, the content publisher can identify the content slots that the content publisher would like to participate in a direct content placement campaign. In some implementations, the content publisher can tag the content slot via a source code of the information resource. In some implementations, the method can configure one or more of the content slots of the information resource to be reserved. This can be possible by configuring the content slot to only receive creatives from the method.

The method can insert an actionable object within the identified third-party content slot available to be reserved to serve one or more creatives (Block 915). The actionable object can be configured to generate a request to provide an interface for reserving the identified third-party content slot to display the creative responsive to an action being taken on the actionable object. In some implementations, the actionable reservation object can be configured to cause the method to provide a reservation interface through which a content provider can reserve the content slot in which the reservation object was inserted in response to an action being taken on the actionable reservation object. The actionable reservation object can include one or more of a link, a creative, a button, an icon, or any other actionable object on which an action can be taken via an input device or mechanism.

In some implementations, the method can insert an content slot occupying object within the content slot in which the actionable reservation object is inserted or placed. The content slot occupying object can be configured to occupy the content slot. In some implementations, the content slot occupying object can be translucent such that the content slot occupying object partially obscures an underlying creative previously inserted in the content slot. In some implementations, the content slot occupying object can be opaque such that it completely obscures an underlying creative. In some implementations, the content slot occupying object can partially occupy the content object. In some implementations, the content slot occupying object can match the dimensions of the content slot. In some implementations, the content slot occupying object be of a particular color that stands out against a background color of the information resource. In this way, the content slot occupying object can help a content provider view the area where a creative of the content provider will appear if the content provider reserves the content slot. In some implementations, the method can select a shape, size, color, translucency, opacity, or other characteristics of the content slot occupying object.

The method can render the information resource including the inserted actionable reservation object within the identified third-party content slot (Block 920). In some implementations, the content slot insertion module 732 can render the information resource including the inserted actionable reservation object within the identified third-party content slot in response to an action being taken on the view-changing object.

D. Automatically Resizing a Creative Based on Dimensions of a Content Slot

Figure 11:
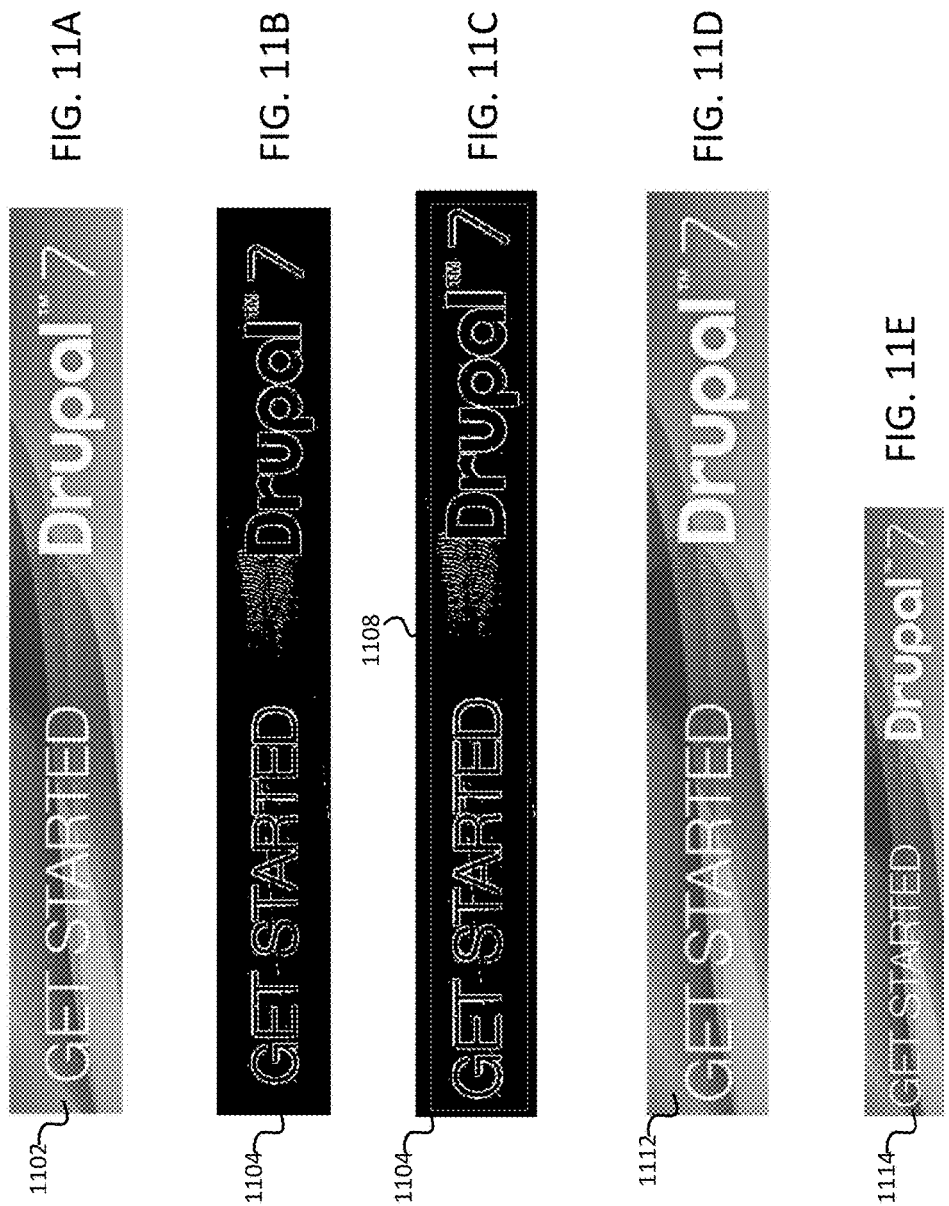
FIGS. 11A-11E depict various stages of a process of automatically resizing a creative based on dimensions of a content slot, according to an illustrative implementation.

FIG. 11 illustrates an system 1100 for automatically resizing a creative based on dimensions of a content slot via at least one computer network, such as the network 105. The system 1100 can include one or more components of the system 100 shown in FIG. 1, the system 300 shown in FIG. 3 and the system 700 shown in FIG. 7. The system 1100 includes the data processing system 110 shown in FIGS. 1, 3 and 7, but includes additional modules configured to automatically resize a creative based on dimensions of a content slot.

The data processing system 110 can include a creative analysis module 1030 and a creative processing module 1032. The data processing system can receive a content object, such as a creative (for instance, an ad) including one or more visual content items. The creative can have a first set of dimensions. The data processor can determine a content slot having a second set of dimensions in which to insert the creative. The data processor can determine an aspect ratio of the creative and an aspect ratio of the content slot. The data processor can apply edge detection to identify edges of the visual content items included in the creative. The data processor can then apply a bounding box around a substantial portion of the identified edges of the content items. The bounding box can be sized to have an aspect ratio that corresponds to a smaller of the aspect ratio of the creative and the aspect ratio of the content slot. The data processor can then can resize the bounding box to fit within the second set of dimensions corresponding to the content slot.

Figure 10:
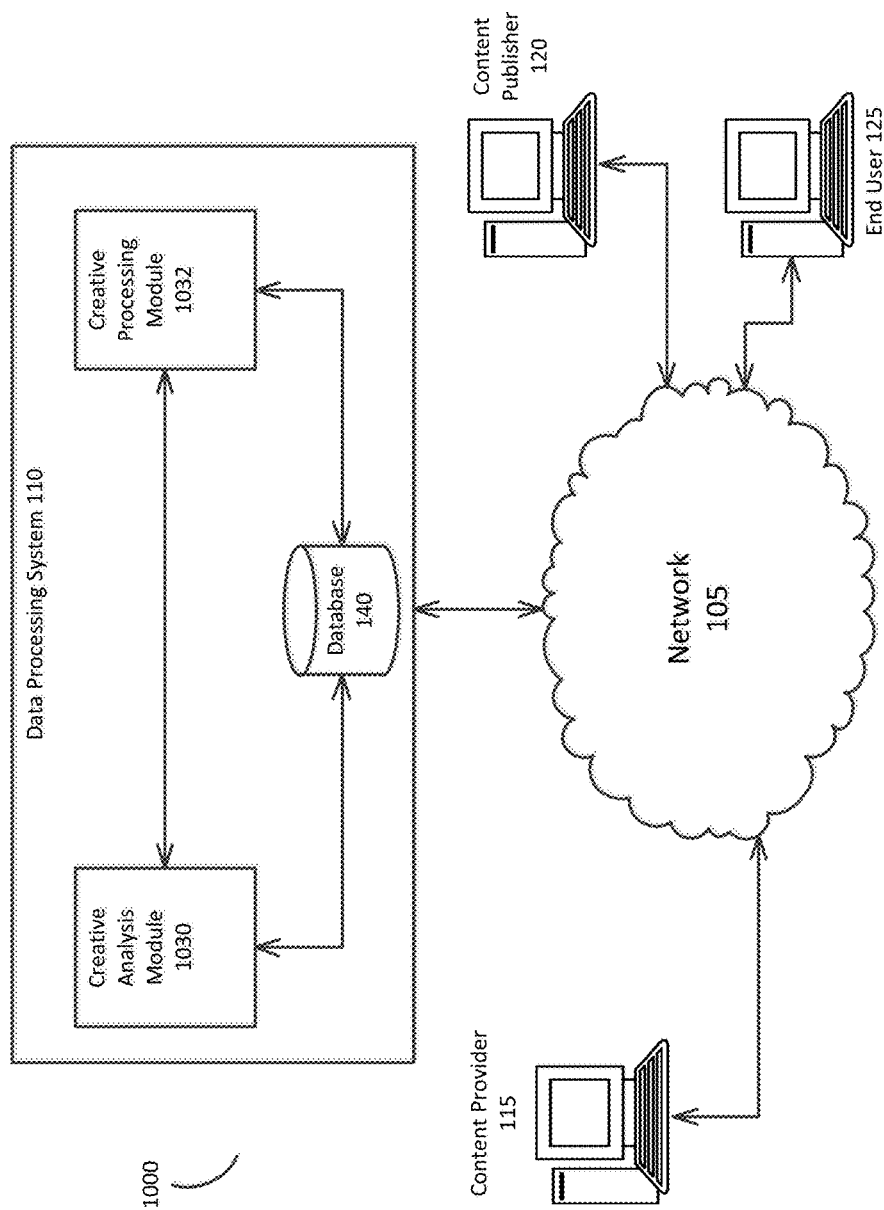
FIG. 10 is a block diagram depicting one environment to automatically resizing a creative based on dimensions of a content slot, according to an illustrative implementation.

FIGS. 11A-11E depict various stages of a process of automatically resizing a creative based on dimensions of a content slot. A creative 1102 is shown in FIG. 11A. The creative 1102 is a rectangle having a corresponding length and width and a corresponding aspect ratio. The creative 1102 includes multiple content items, such as the letters that spell out "GET STARTED", "DRUPAL", "TM" and the number "7". In addition, the creative includes content items that form the background design of the creative. The creative 1102 is then processed over a series of stages, the result of each stage shown in the FIGS. 11B-11E. The description of the creative analysis module 1030 and the creative processing module 1032 shown in FIG. 10 are described herein with the aid of the visual representations shown in FIGS. 11B-11E.

The creative analysis module 1030 of the data processing system 110 can be part of, or can include scripts executed by, one or more servers in the data processing system 110. In some implementations, the creative analysis module 1030 can be configured to receive a content object, such as a creative 1102 (for instance, an ad) including one or more visual content items. In some implementations, the creative analysis module 1030 can receive the creative from a third-party content publisher seeking to participate in a content placement campaign. In some implementations, the creative analysis module 1030 can receive a request to create one or more creatives suitable for insertion into one or more content slots. In some implementations, the content slots may correspond to standard content slot sizes. In some implementations, the content slots may have dimensions that are different from the standard content slot sizes.

The creative analysis module 1030 can be configured to determine the dimensions of the creative 1102. In some implementations, the creative analysis module 1030 can determine the dimensions of the creative 1102 by analyzing the locations between the pixels that define the corners of the creative 1102. In some implementations, the creative analysis module 1030 can determine the dimensions of the creative 1102 through other known techniques for determining dimensions of images.

The creative analysis module 1030 can be configured to identify one or more content slots in which a resized version of the creative 1102 can be inserted. FIG. 11E shows a resized creative 1114. In some implementations, the request identifying the creative 1102 can include a request to create a plurality of creatives that correspond to one or more standard content slots. In some implementations, the creative analysis module 1030 can determine or identify dimensions of the content slots in which a resized creative 1114 derived from the original creative 1102 can be inserted.

The creative analysis module 1030 can be configured to determine an aspect ratio of the content slot in which the resized creative 1114 can be inserted. The creative analysis module 1030 can determine the aspect ratio based on the dimensions of the content slot. The aspect ratio of a rectangle is a ratio of the length to a width of the rectangle. The aspect ratio of a square is 1. The creative analysis module 1030 also can be configured to determine an aspect ratio of the original creative 1102. The creative analysis module 1030 can determine the aspect ratio based on the dimensions of the creative 1102. The creative analysis module 1030 can be configured to compare the aspect ratios of the content slot and the aspect ratio of the creative and determine which of the aspect ratio of the content slot or the creative has the smaller aspect ratio.

The creative processing module 1032 of the data processing system 110 can be part of, or can include scripts executed by, one or more servers in the data processing system 110. In some implementations, the creative processing module 1032 can be configured to apply edge detection to identify edges of the visual content items included in the creative. In some implementations, the creative processing module 1032 can apply laplacian edge detection to the original creative 1102 to form a processed creative 1104. In some such implementations, the creative processing module 1032 can apply laplacian edge detection with further thresholding of a predetermined threshold level. In some implementations, the predetermined threshold level can be around 0.5-0.9, or more specifically, around 0.6-0.8, or more specifically, around 0.7. In some implementations, the creative processing module 1032 can apply gradient edge detection to the original creative 1102 or the processed creative 1104. In some implementations, the creative processing module 1032 can apply differential edge detection to detect sub-pixels. In some implementations, the creative processing module 1032 can apply edge thinning to the original creative 1102 or the processed creative 1104 to filter out any artifacts that have dimensions that are below a certain threshold.

The creative processing module 1032 can be configured to apply a bounding box 1108 around a substantial portion of the identified edges of the content items of the processed creative 1104. The bounding box 1108 can be sized to have an aspect ratio that corresponds to a smaller of the aspect ratio of the original creative and the aspect ratio of the content slot in which to insert the resized creative 1114. In some implementations, applying a bounding box 1108 around a substantial portion of the identified edges of the content items of the creative 1104 can include applying a bounding box 1108 around all of the content items. In some implementations, applying a bounding box 1108 around a substantial portion of the identified edges of the content items of the processed creative 1104 can include applying the smallest possible bounding box that encompasses substantially all of the content items within the creative, for instance, about 95% or more (in some implementations, about 99%) of the content items included in the creative. In some implementations, the bounding box can be applied such that pixels that are part of content items deemed important to the original creative 1104 are included within the bounding box 1108. In some implementations, the creative processing module 1032 can identify content items, such as letters or numbers, as important to the creative 1102. As such, the creative processing module 1032 can apply a bounding box 1108 such that none of the pixels that form part of the content items identified as important lie outside the bounding box 1108.

The creative processing module 1032 can also be configured to determine whether a particular creative can be resized to fit within a particular content slot without compromising on the quality of the creative. In some implementations, the creative processing module can determine that the particular creative cannot be resized to fit within a particular content slot in response to determining that a bounding box cannot be sized to include substantially all portions of all of the visual content items deemed important to the creative. For instance, the creative processing module 1032 can determine that the original creative 1102 cannot be resized to fit within a particular content slot in response to determining that a bounding box cannot be sized to include more than 98% of the pixels of the content items deemed important to the creative. In some implementations, the boundary box may be small enough such that no portion of the boundary box can extend beyond the boundary of the creative to be resized. In some implementations, the boundary box may be small enough such that only a predetermined threshold, for instance, 10% of the area defined by the boundary box can extend beyond the boundary of the creative to be resized. In some implementations, the creative processing module 1032 can generate a notification indicating that the creative cannot be automatically resized to fit within the dimensions of the content slot in response to determining that the bounding box cannot be sized to include substantially all portions of all of the visual content items deemed important to the creative.

In some implementations, the creative processing module 1032 can be configured to increase the size of the bounding box 1108 to include a margin. The margin can be a predetermined amount, for instance, adding a predetermined number of pixels to each dimension. In some implementations, the number of pixels can range from about 10-200 pixels. In some implementations, size of the margin can be determined heuristically. In some implementations, the size of the margin can be provided by the third-party content provider. In some implementations, the size of the margin can be based on a percentage of the dimensions of the bounding box. In some implementations, the margins can be applied such that the aspect ratio of the bounding box 1108 remains the same. FIG. 11D shows a cropped creative 1112 corresponding to the cropped portion of the processed creative 1104. The cropped portion corresponds to the portion encompassed by the bounding box 1108. Once the processed creative 1104 is cropped, the edge detection filter can be removed.

The creative processing module 1032 can then can resize the cropped creative 1112 to form the resized creative 1114 that is sized to fit within the second set of dimensions corresponding to the content slot. The cropped creative 1112 can be scaled to a size that can fit within the content slot. The creative processing module 1032 can scale the cropped creative by matching a length of the cropped creative 1112 to a length of the content slot and matching the width of the cropped creative 1112 to a width of the content slot. As the cropped creative has an aspect ratio that corresponds to the aspect ratio of the content slot, the aspect ratio of the cropped creative 1112 remains the same as the aspect ratio of the resized creative 1114.

In some implementations, the creative processing module 1032 can store the resized creative in a data store, such as the database 1040. In some implementations, the creative processing module 1032 can provide the resized creative, for display, to the third-party content provider. The creative processing module 1032 can provide an interface through which the third-party content provider can approve or reject the resized creative for use in content placement campaigns. In some implementations, the creative processing module 1032 can provide an interface to the third-party content provider or to any other entity through which the bounding box can be repositioned or resized. In this way, the third-party content provider or other entity can influence the appearance of the resized creative. In some implementations, the creative processing module 1032 can further allow the third-party content provider or other entity to modify the resized creative using a graphics interface. The graphics interface, can for instance, be used to change colors, add lines or other visual content, modify or remove existing visual content, amongst others.

In some implementations, the creative processing module 1032 can compare a resized creative that was rejected for use in content placement campaigns with a resized creative of the same size and derived from the same original creative that was approved to better understand why the resized creative was rejected. In this way, the creative processing module 1032 can identify particular characteristics that may cause a resized image to be rejected and thereby, improve the process of automatically resizing creatives to avoid such characteristics in the future. In this way, the creative processing module 1032 can be self-learning or self-improving. In some implementations, as part of the creative processing module's ability to self-learn, the creative processing module 1032 can also be configured to analyze existing creatives that have been approved for a particular content slot size to identify characteristics of such creatives.

In some implementations, the creative processing module 1032 can, alone or in conjunction with other modules of data processing system 110, receive requests to provide creatives corresponding to a particular content slot size and in response to the requests, retrieve or generate resized creatives and provide such resized creatives.

Figure 12:
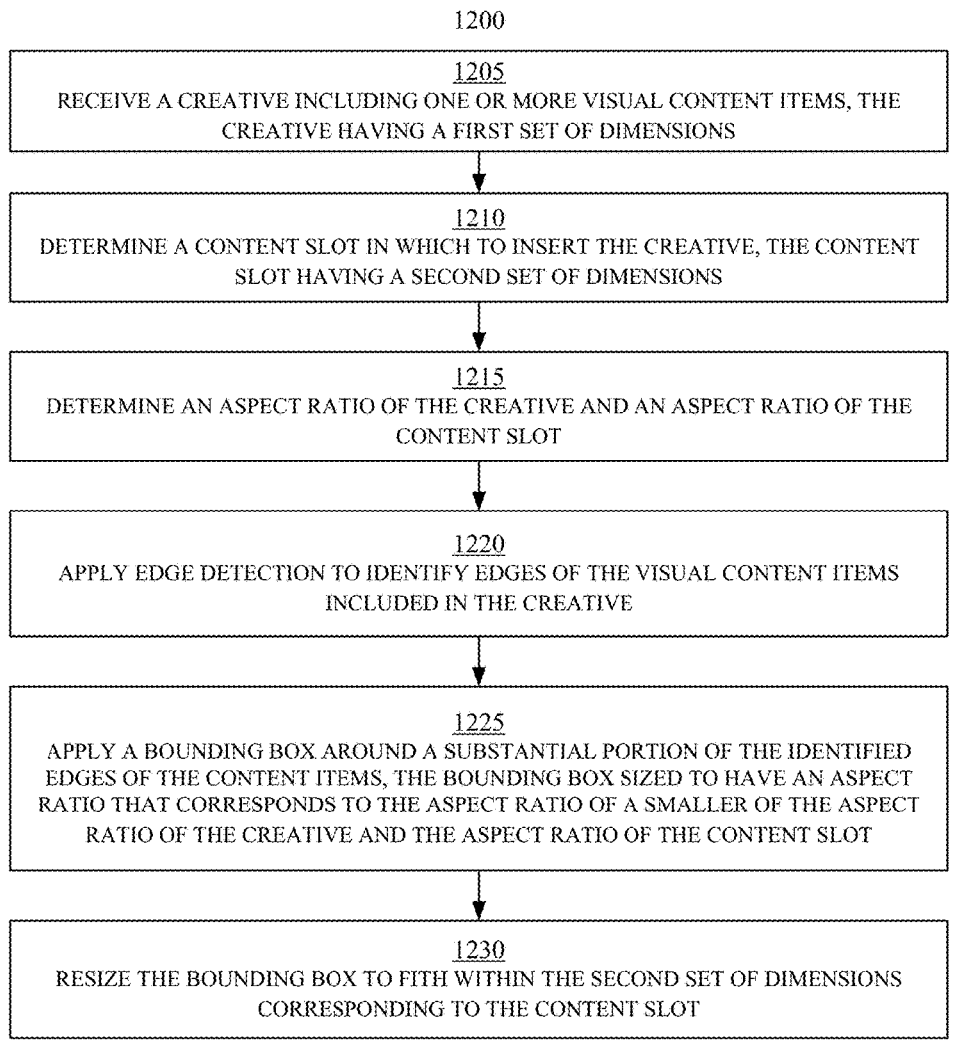
FIG. 12 is a flow diagram depicting an method of automatically resizing a creative based on dimensions of a content slot, according to an illustrative implementation.

FIG. 12 is a flow diagram depicting an method of automatically resizing a creative based on dimensions of a content slot, according to an illustrative implementation. In brief overview, the method 1200, via a processor of a data processing system, such as the data processing system 1000 shown in FIG. 10, can receive a content object, such as a creative (for instance, an ad) including one or more visual content items (Block 1205). The method can determine a content slot having a second set of dimensions in which to insert the creative (Block 1210). The method can determine an aspect ratio of the creative and an aspect ratio of the content slot (Block 1215). The method can apply edge detection to identify edges of the visual content items included in the creative (Block 1220). The method can then apply a bounding box around a substantial portion of the identified edges of the content items (Block 1225). The method can then can resize the bounding box to fit within the second set of dimensions corresponding to the content slot (Block 1230).

In further detail, the method 1200 can receive a content object, such as a creative including one or more visual content items (Block 1205). In some implementations, the method can receive the creative (original creative) from a third-party content publisher seeking to participate in a content placement campaign. In some implementations, the method can receive a request to create one or more resized creatives suitable for insertion into one or more content slots based on the original creative. In some implementations, the content slots may correspond to standard content slot sizes. Instances of standard slot sizes include 728×90, 468×60, 320×50, 50×50, amongst others. In some implementations, the content slots may have dimensions that are different from the standard content slot sizes.

The method can be configured to determine the dimensions of the original creative. In some implementations, the method can determine the dimensions of the original creative by analyzing the locations between the pixels that define the corners of the original creative. In some implementations, the method can determine the dimensions of the original creative through other known techniques for determining dimensions of images.

The method can determine a content slot having a second set of dimensions in which to insert a resized creative derived from the original creative (Block 1210). In some implementations, the method can identify one or more content slots in which a resized creative derived from the original creative received by the method can be inserted. In some implementations, the request identifying the original creative can include a request to create a plurality of resized creatives that correspond to one or more standard content slots. In some implementations, the method can determine or identify dimensions of the content slots in which a resized creative 1114 derived from the original creative 1102 can be inserted. In some implementations, the method can be configured to automatically generate a request to resize the original creative into one or more resized creatives that can fit within or match one or more content slot sizes, and in particular, standard content slot sizes.

The method can determine an aspect ratio of the original creative and an aspect ratio of the content slot in which to insert a resized creative derived from the original creative (Block 1215). In some implementations, the method can be configured to determine an aspect ratio of the content slot in which the resized creative can be inserted. The method can determine the aspect ratio based on the dimensions of the content slot. The method can determine an aspect ratio of the original creative. The method can determine the aspect ratio based on the dimensions of the creative. The method can compare the aspect ratios of the content slot and the aspect ratio of the creative and determine which of the aspect ratio of the content slot or the creative has the smaller aspect ratio.

The method can apply edge detection (Block 1220). In some implementations, the method can apply edge detection to identify edges of the visual content items included in the original creative. In some implementations, the method can apply laplacian edge detection to the original creative to form or generate a processed creative. In some such implementations, the method can apply laplacian edge detection with further thresholding of a predetermined threshold level. In some implementations, the predetermined threshold level can be around 0.5-0.9, or more specifically, around 0.6-0.8, or more specifically, around 0.7. In some implementations, the method can apply gradient edge detection to the original creative or the processed creative. In some implementations, the method can apply differential edge detection to detect sub-pixels. In some implementations, the method can apply edge thinning to the original creative or the processed creative to filter out any artifacts that have dimensions that are below a certain threshold.

The method can apply a bounding box around a substantial portion of the identified edges of the content items (Block 1225). In some implementations, the bounding box can be sized to have an aspect ratio that corresponds to a smaller of the aspect ratio of the original creative and the aspect ratio of the content slot in which to insert the resized creative. In some implementations, applying a bounding box 1108 around a substantial portion of the identified edges of the content items of the processed creative can include applying a bounding box around all of the content items. In some implementations, applying a bounding box around a substantial portion of the identified edges of the content items of the processed creative can include applying the smallest possible bounding box that encompasses substantially all of the content items within the creative, for instance, about 95% or more (in some implementations, about 99%) of the content items included in the creative. In some implementations, the bounding box can be applied such that pixels that are part of content items deemed important to the original creative 1104 are included within the bounding box 1108. In some implementations, the method can identify content items, such as letters or numbers, as important to the original creative. As such, the method can apply a bounding box such that none of the pixels that form part of the content items identified as important lie outside the bounding box.

In some implementations, the method can determine whether a particular original creative can be resized to fit within a particular content slot without compromising on the quality of the visual aspects of the original creative. In some implementations, the method can determine that the particular creative cannot be resized to fit within a particular content slot in response to determining that a bounding box cannot be sized to include substantially all portions of all of the visual content items deemed important to the creative. For instance, the method can determine that the original creative cannot be resized to fit within a particular content slot in response to determining that a bounding box cannot be sized to include more than 98% of the pixels of the content items deemed important to the creative. In some implementations, the boundary box may be small enough such that no portion of the boundary box can extend beyond the boundary of the creative to be resized. In some implementations, the boundary box may be small enough such that only a predetermined threshold, for instance, 10% of the area defined by the boundary box can extend beyond the boundary of the creative to be resized. In some implementations, the method can generate a notification indicating that the creative cannot be automatically resized to fit within the dimensions of the content slot in response to determining that the bounding box cannot be sized to include substantially all portions of all of the visual content items deemed important to the creative.

In some implementations, the method can increase the size of the bounding box to include a margin. The margin can be a predetermined amount, for instance, adding a predetermined number of pixels to each dimension. In some implementations, the number of pixels can range from about 10-200 pixels. In some implementations, size of the margin can be determined heuristically. In some implementations, the size of the margin can be provided by the third-party content provider. In some implementations, the size of the margin can be based on a percentage of the dimensions of the bounding box. In some implementations, the margins can be applied such that the aspect ratio of the bounding box remains the same. The cropped portion corresponds to the portion encompassed by the bounding box. In some implementations, once the processed creative 1104 is cropped, the method can remove the edge detection filter from the cropped creative.

The method can resize the bounding box to fit within the second set of dimensions corresponding to the content slot (Block 1230). In some implementations, the method can scale the cropped creative to a size that can fit within the content slot. The method can scale the cropped creative by matching a length of the cropped creative to a length of the content slot and matching the width of the cropped creative to a width of the content slot. As the cropped creative has an aspect ratio that corresponds to the aspect ratio of the content slot, the aspect ratio of the cropped creative remains the same as the aspect ratio of the resized creative.

The method can further include a process of providing a resized creative for display. In some implementations, the method can receive a request to serve a creative that corresponds to a particular content slot. In some implementations, the request can identify a size of the content slot. In some implementations, the method can identify the resized creative that corresponds to the identified size of the content slot and provide the resized creative. In some implementations, the method can begin the process of resizing an original creative to fit within the identified size of the content slot responsive to receiving a request to serve a creative. In some implementations, the method can retrieve a resized creative stored in a data store responsive to receiving the request.

Figure 13:
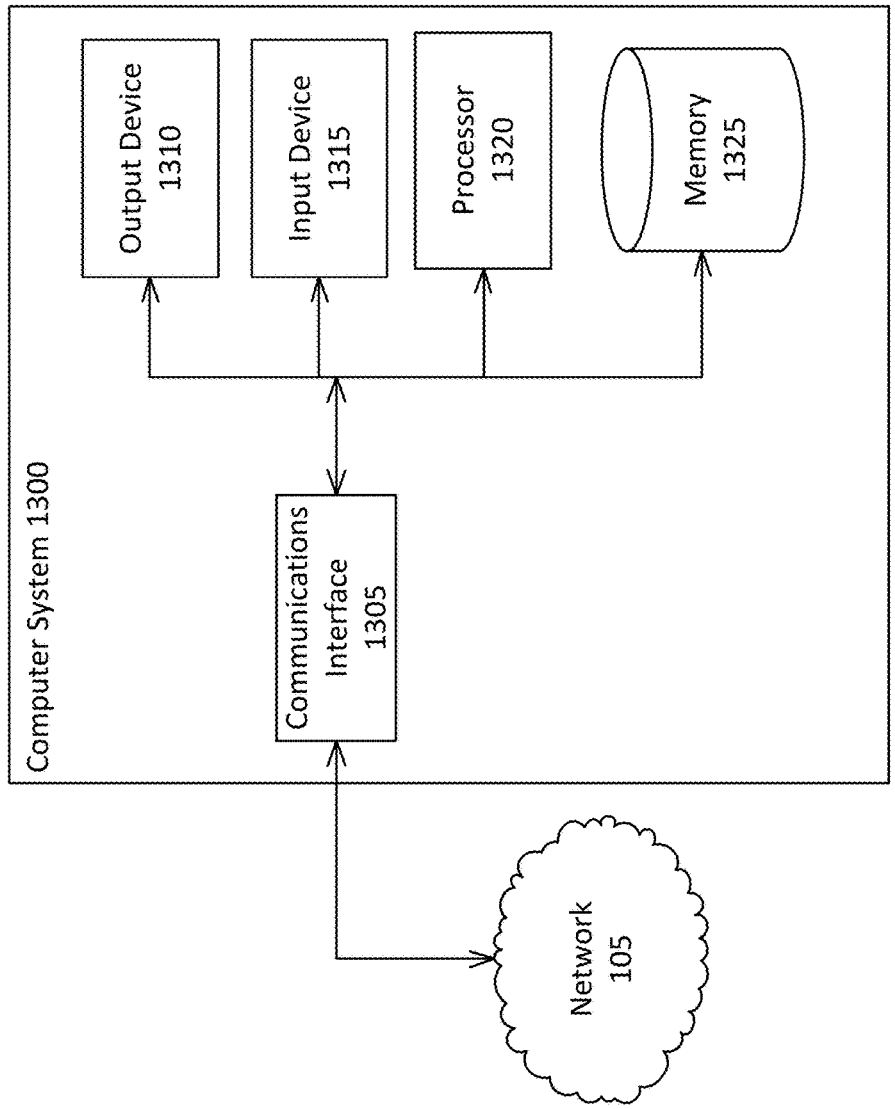
FIG. 13 is a block diagram illustrating a general architecture for a computer system that may be employed to implement elements of the systems and methods described and illustrated herein, according to an illustrative implementation.

FIG. 13 is a block diagram illustrating a general architecture for a computer system that may be employed to implement elements of the systems and methods described and illustrated herein, according to an illustrative implementation.

FIG. 13 shows the general architecture of an illustrative computer system 1300 that may be employed to implement any of the computer systems discussed herein (including the system 100 and its components such as the data processing system 110, the content placement management module 130, the conversion rate model generation module 132, the conversion rate prediction module 134, the solicitation module 330, the reservation interface module 332, the creative placement module 334, the actionable object module 730, the content slot insertion module 732, the creative analysis module 1030 and the creative processing module 1032) in accordance with some implementations. The computer system 1300 can be used to provide information via the network 105, for to preview content items associated with the content provider computing device 115. The computer system 1300 includes one or more processors 1320 communicatively coupled to at least one memory 1325, one or more communications interfaces 1305, and one or more output devices 1310 (e.g., one or more display units) and one or more input devices 1315. The processors 1320 can be included in the data processing system 110 or the other components of the system 100 such as the content placement management module 130, the conversion rate model generation module 132, the conversion rate prediction module 134, the solicitation module 330, the reservation interface module 332, the creative placement module 334, the actionable object module 730, the content slot insertion module 732, the creative analysis module 1030 and the creative processing module 1032.

The memory 1325 can include computer-readable storage media, and can store computer instructions such as processor-executable instructions for implementing the operations described herein. The content placement management module 130, the conversion rate model generation module 132, the, the conversion rate prediction module 134, or the database 140 can include the memory 1325 to store content item data, content item slot data, information about information resources, or characteristics of end user computing devices 125, for instance. The processor(s) 1320 can execute instructions stored in the memory 1325 and can read from or write to the memory information processed and or generated pursuant to execution of the instructions.

The processors 1320 can be communicatively coupled to or control the communications interface(s) 1305 to transmit or receive information pursuant to execution of instructions. For instance, the communications interface(s) 1305 can be coupled to a wired or wireless network, bus, or other communication means and can allow the computer system 1300 to transmit information to or receive information from other devices (e.g., other computer systems). One or more communications interfaces 1305 can facilitate information flow between the components of the system 100. In some implementations, the communications interface(s) can be configured (e.g., via hardware components or software components) to provide a website as an access portal to at least some aspects of the computer system 1300. Instances of communications interfaces 1305 include user interfaces, the reservation interfaces, and other graphical interfaces through which the third-party content providers and content publishers can communicate with the data processing system 110.

The output devices 1310 can allow information to be viewed or perceived in connection with execution of the instructions. The input device(s) 1315 can allow a user to make manual adjustments, make selections, enter data or other information, or interact in any of a variety of manners with the processor during execution of the instructions.

The subject matter and the operations described herein can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices). The operations described in this specification can be implemented as operations performed by a data processing apparatus on data stored on one or more computer-readable storage devices or received from other sources.

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For instance, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The term "data processing system" or "computing device" "module" "engine" "component" or "computing device" encompasses apparatuses, devices, and machines for processing data, including a programmable processor, a computer, a system on a chip, or multiple ones, or combinations, of the foregoing, amongst others. The apparatuses can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination thereof. The apparatus and execution environment can realize various different computing model infrastructures, such as web services, distributed computing and grid computing infrastructures. The content placement management module 130, the conversion rate model generation module 132, the or the conversion rate prediction module 134 can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 110) to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

The subject matter described herein can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or a combination of one or more such back-end, middleware, or front-end components. The components of the system can be interconnected by any form or medium of digital data communication, e.g., a communication network. Communication networks can include a local area network ("LAN") and a wide area network ("WAN"), an inter-network (e.g., the Internet), and peer-to-peer networks (e.g., ad hoc peer-to-peer networks), amongst others.

The computing system such as system 100 or system 1300 can include clients and servers. A client and server are generally remote from each other and typically interact through a communication network (e.g., the network 105). The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server (e.g., received by the data processing system 110 from the content provider computing device 115).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For instance, the content placement management module 130, the conversion rate model generation module 132, the conversion rate prediction module 134, the solicitation module 330, the reservation interface module 332, the creative placement module 334, the actionable object module 730, the content slot insertion module 732, the creative analysis module 1030 and the creative processing module 1032 can be a single module, a logic device having one or more processing circuits, or part of an online content item placement system.

Having now described some illustrative implementations, it is apparent that the foregoing is illustrative and not limiting. In particular, although many of the implementations presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations.

References to any act or element being based on any information, act or element may include implementations where the act or element is based at least in part on any information, act, or element.

Any implementation disclosed herein may be combined with any other implementation, and references to "an implementation," "some implementation," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method comprising:
   receiving, by a data processor, an indication from a first party of interest in providing a creative for display within an information resource including one or more third-party content slots;
   identifying, by the data processor, a third-party content slot included in the information resource available to be reserved;
   inserting, by the data processor, an actionable reservation object within the identified third-party content slot, the actionable reservation object configured to generate a request to provide a reservation interface for reserving the identified third-party content slot responsive to an interaction with the actionable reservation object;
   providing, to the first party, by the data processor, the information resource including the actionable reservation object inserted within the identified third-party content slot;
   receiving, by the data processor, the creative for display within the information resource, the creative including a visual content item and having a first set of dimensions different from a second set of dimensions for the identified third-party content slot; and
   creating, by the data processor, a modified creative fitting the second set of dimensions of the identified third-party content slot.

2. The method of claim 1, comprising creating the modified creative by:
   cropping, by the data processor, the creative based on the second set of dimensions of the identified third-party content slot.

3. The method of claim 1, comprising creating the modified creative by:
  determining, by the data processor, an aspect ratio of the creative and an aspect ratio of the identified third-party content slot;
  identifying, by the data processor, using edge detection, edges of the visual content item;
  applying, by the data processor, a bounding box around a substantial portion of the identified edges of the content item, the bounding box sized to have an aspect ratio that corresponds to a smaller of the determined aspect ratio of the creative and the determined aspect ratio of the identified third-party content slot; and
  cropping the visual content item based on the bounding box to create the modified creative.

4. The method of claim 3, wherein using edge detection comprises applying one of:
  Laplacian edge detection;
  gradient edge detection; or
  differential edge detection to detect sub-pixels.

5. The method of claim 3, further comprising inserting a margin between the bounding box and the identified edges.

6. The method of claim 5, further comprising determining a size for the margin based on an aspect ratio of the bounding box and the aspect ratio of the second set of dimensions for the identified third-party content slot.

7. The method of claim 3, wherein applying a bounding box around a substantial portion of the identified edges of the content items includes applying a smallest bounding box that encompasses at least 95% of pixels associated with the visual content item included in the creative.

8. The method of claim 1, wherein the visual content item included in the received creative covers a set of pixels, the method further comprising:
  determining, by the data processor, that the modified creative fitting the second set of dimensions of the identified third-party content slot does not include at least a threshold percentage of the set of pixels covered by the visual content item; and
  generating a notification indicating that the creative cannot be automatically fit within the dimensions of the content slot.

9. The method of claim 1, further comprising automatically identifying the visual content item.

10. A system for providing an actionable object within a third-party content slot of an information resource, the system comprising a data processor configured to:
  receive an indication from a first party of interest in providing a creative for display within an information resource including one or more third-party content slots;
  identify a third-party content slot included in the information resource available to be reserved;
  insert an actionable reservation object within the identified third-party content slot, the actionable reservation object configured to generate a request to provide a reservation interface for reserving the identified third-party content slot responsive to an interaction with the actionable reservation object;
  provide the information resource to the first party, the information resource including the actionable reservation object inserted within the identified third-party content slot;
  receive the creative for display within the information resource, the creative including a visual content item and having a first set of dimensions different from a second set of dimensions for the identified third-party content slot; and
  create a modified creative fitting the second set of dimensions of the identified third-party content slot.

11. The system of claim 10, the data processor configured to create the modified creative by cropping the creative based on the second set of dimensions of the identified third-party content slot.

12. The system of claim 10, the data processor configured to create the modified creative by:
  determining an aspect ratio of the creative and an aspect ratio of the identified third-party content slot;
  identifying, using edge detection, edges of the visual content item;
  applying a bounding box around a substantial portion of the identified edges of the content item, the bounding box sized to have an aspect ratio that corresponds to a smaller of the determined aspect ratio of the creative and the determined aspect ratio of the identified third-party content slot; and
  cropping the visual content item based on the bounding box to create the modified creative.

13. The system of claim 12, the data processor configured to insert a margin between the bounding box and the identified edges.

14. The system of claim 13, the data processor configured determine a size for the margin based on an aspect ratio of the bounding box and the aspect ratio of the second set of dimensions for the identified third-party content slot.

15. The system of claim 12, wherein applying a bounding box around a substantial portion of the identified edges of the content items includes applying a smallest bounding box that encompasses at least 95% of pixels associated with the visual content item included in the creative.

16. The system of claim 10, wherein the visual content item included in the received creative covers a set of pixels, the data processor configured to:
  determine that the modified creative fitting the second set of dimensions of the identified third-party content slot does not include at least a threshold percentage of the set of pixels covered by the visual content item; and
  generate a notification indicating that the creative cannot be automatically fit within the dimensions of the content slot.

17. The system of claim 10, the data processor configured to automatically identify the visual content item.

18. A non-transitory computer-readable medium storing instructions that, when executed by a data processor, cause the data processor to:
  receive an indication from a first party of interest in providing a creative for display within an information resource including one or more third-party content slots;
  identify a third-party content slot included in the information resource available to be reserved;
  insert an actionable reservation object within the identified third-party content slot, the actionable reservation object configured to generate a request to provide a reservation interface for reserving the identified third-party content slot responsive to an interaction with the actionable reservation object;
  provide the information resource to the first party, the information resource including the actionable reservation object inserted within the identified third-party content slot;

receive the creative for display within the information resource, the creative including a visual content item and having a first set of dimensions different from a second set of dimensions for the identified third-party content slot; and create a modified creative fitting the second set of dimensions of the identified third-party content slot.

19. The non-transitory computer-readable medium of claim 18, the medium storing instructions that, when executed by a data processor, cause the data processor to create the modified creative by:

determining an aspect ratio of the creative and an aspect ratio of the identified third-party content slot;

identifying, using edge detection, edges of the visual content item;

applying a bounding box around a substantial portion of the identified edges of the content item, the bounding box sized to have an aspect ratio that corresponds to a smaller of the determined aspect ratio of the creative and the determined aspect ratio of the identified third-party content slot; and cropping the visual content item based on the bounding box to create the modified creative.

20. The non-transitory computer-readable medium of claim 19, wherein applying a bounding box around a substantial portion of the identified edges of the content items includes applying a smallest bounding box that encompasses at least 95% of pixels associated with the visual content item included in the creative.

* * * * *